United States Patent [19]
Narabayashi et al.

[11] Patent Number: 5,963,611
[45] Date of Patent: Oct. 5, 1999

[54] STEAM SEPARATOR, NUCLEAR POWER GENERATION PLANT, AND BOILER APPARATUS

[75] Inventors: Tadashi Narabayashi, Yokohama; Miyuki Akiba, Ota-ku; Shinichi Morooka, Suginami-ku; Mikihide Nakamaru, Fujisawa; Makoto Yasuoka, Yokohama, all of Japan

[73] Assignee: Kabushiki Kaisha Toshiba, Kawasaki, Japan

[21] Appl. No.: 08/986,569

[22] Filed: Dec. 5, 1997

[30] Foreign Application Priority Data

Dec. 6, 1996 [JP] Japan .................................. 8-326253
Oct. 21, 1997 [JP] Japan .................................. 9-288238

[51] Int. Cl.[6] .................................................. G21C 15/16
[52] U.S. Cl. .......................... 376/371; 376/372; 96/208; 96/216; 96/220; 55/DIG. 23
[58] Field of Search .................................... 376/371, 370, 376/372; 55/DIG. 23; 95/261, 262; 96/206, 208, 216, 220

[56] References Cited

U.S. PATENT DOCUMENTS 3,031,977  5/1962  Elliott ..................................... 417/179
5,130,082  7/1992  Oosterkamp ............................ 376/371
5,321,731  6/1994  Oosterkamp ............................ 376/371

FOREIGN PATENT DOCUMENTS 687 040  8/1996  Switzerland .

*Primary Examiner*—Daniel D. Wasil
*Attorney, Agent, or Firm*—Foley & Lardner

[57] ABSTRACT

A separator/injector having an outlet pressure higher than an inlet pressure thereof is introduced instead of the dynamic equipment for a reactor recirculation system that is necessary in the prior art, to achieve both liquid-vapor separation and forced circulation. A jet pump and a recirculation flow-rate control valve are provided in a lower portion of a downcomer portion of a reactor pressure vessel. A shroud head has a double-walled structure, a two-phase liquid-vapor flow that is flowing from a lower portion of the lower shroud head is accelerated by an accelerator nozzle of the separator/injector, and a liquid component of the thus-separated flow is increased in pressure and guided into a jet pump through a space formed between the double shroud heads. Alternatively, a circular cylindrical separator/injector in which the steam nozzle and diffuser are disposed in a helical form in close proximity to the inner wall of a circular tube above the stand pipe could be provided instead of this separator/injector.

31 Claims, 29 Drawing Sheets

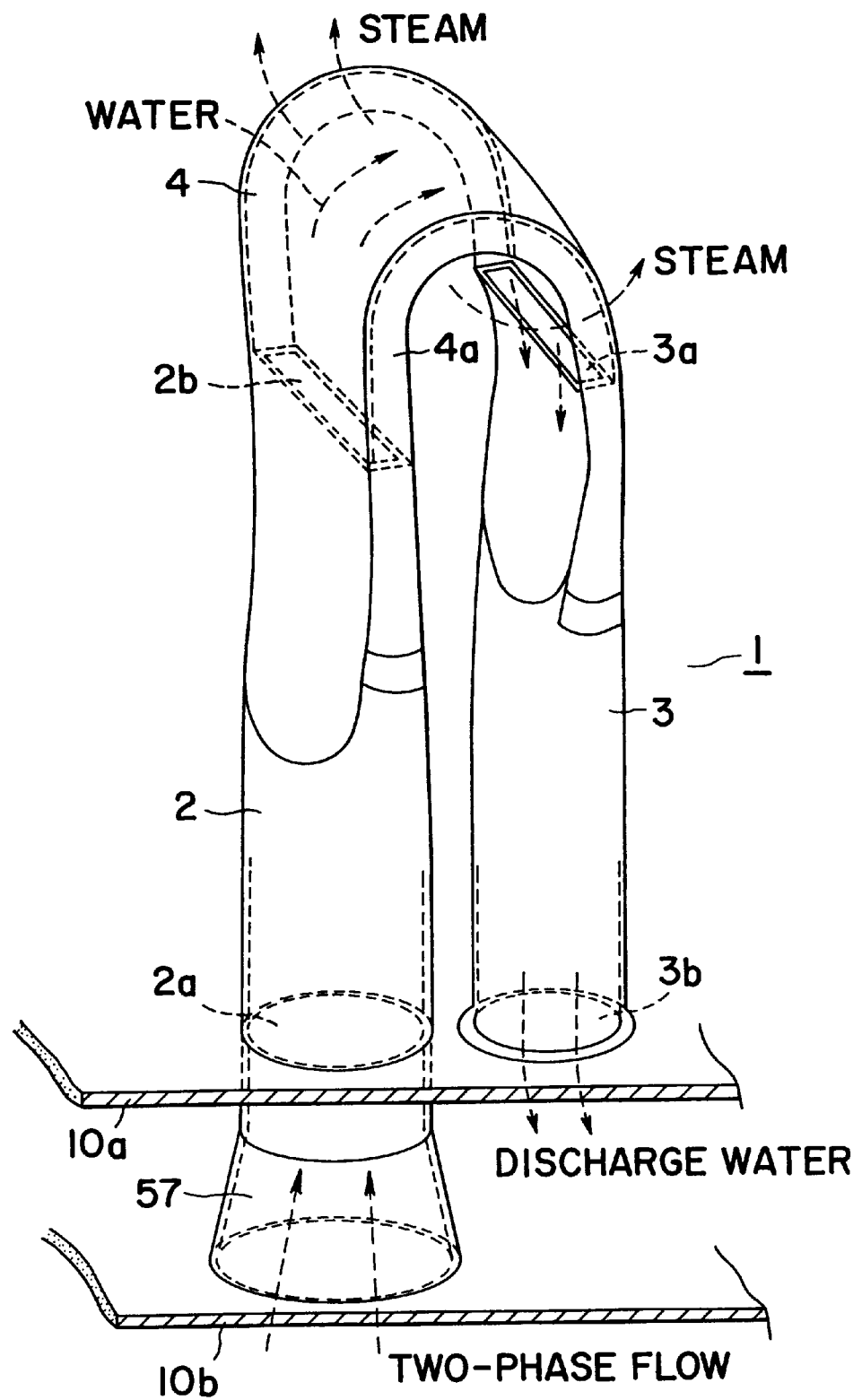
F I G. 1

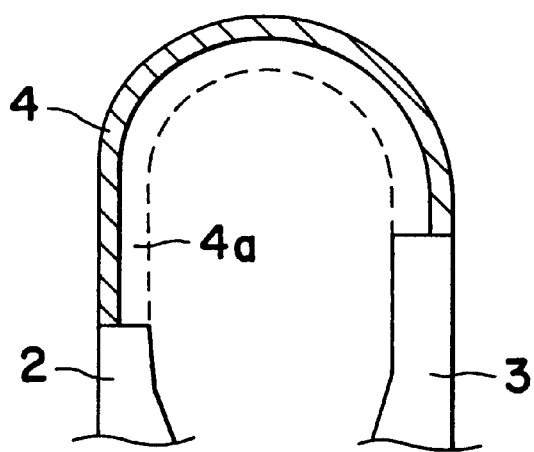
F I G. 6 (a)
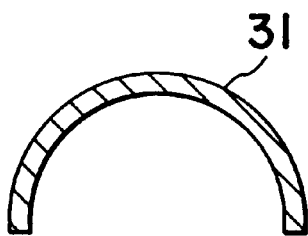
F I G. 6 (b)
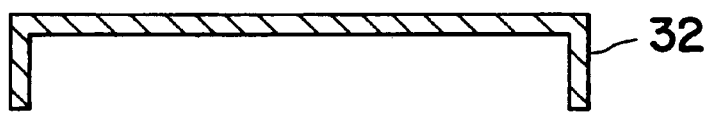
F I G. 6 (c)
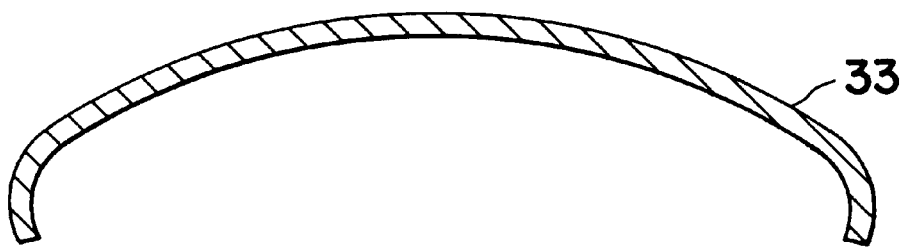
F I G. 6 (d)

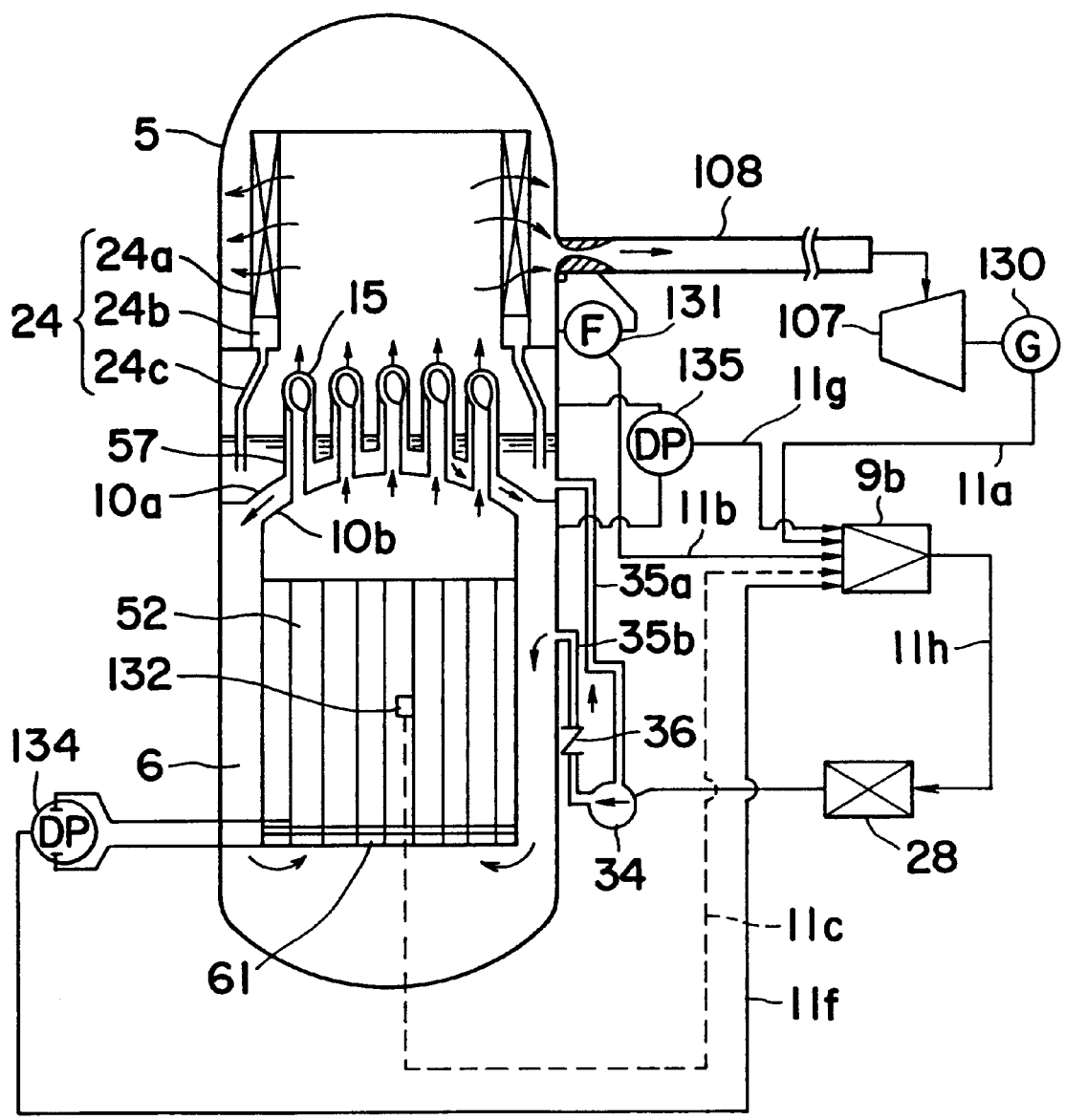
F I G. 15

STEAM SEPARATOR, NUCLEAR POWER GENERATION PLANT, AND BOILER APPARATUS

BACKGROUND OF THE INVENTION

FIELD OF THE INVENTION

The present invention relates to a steam separator, a nuclear power generation plant, and a boiler apparatus equipped with a separator/injector having a two-phase flow accelerator nozzle for guiding a two-phase flow of mixed liquid and vapor components in the interior thereof and accelerating the same, a liquid-phase capture means for capturing the liquid phase of the thus accelerated two-phase flow, and means for increasing the pressure of this liquid phase and imparting a recirculation drive force thereto.

The description herein relates to nuclear power plants in general, taking a boiling-water reactor as an example with reference to the accompanying drawings.

Referring to FIG. 27, a reactor container 106 of a boiling-water reactor (BWR) is configured of a reactor pressure vessel 102 accommodating a core 101, a drywell 103 that contains this reactor pressure vessel 102, and a wetwell 105 having a pressure suppression pool 104. In addition, this nuclear power plant comprises a turbine 107, a main steam line 108 that supplies steam to that turbine 107, a main condenser 109, a condensate pump 110, a feedwater pump 111 that supplies feedwater to the reactor pressure vessel 102, a feedwater heater 112, a feedwater pipeline 113, a reactor recirculation system 114 that causes changes in the quantity of core coolant that recirculates therethrough, a control rod drive system 115 that controls the output, a standby coolant system 116 that operates when the reactor has been isolated by valves, a residual heat removal system that removes residual heat when the reactor is halted, and an emergency core coolant system (ECCS) that operates during emergencies.

Existing BWRs use a forced recirculation method by which coolant is sent through the core by the reactor recirculation system 114. This reactor recirculation system 114 is configured of a recirculation pump 117 and a jet pump 118. In an emergency, the recirculation pump 117 has a certain amount of inertia and takes about five seconds to stop, so the cooling efficiency of the coolant has to rely on a relatively weak natural circulatory system.

The ECCS is configured of a high-pressure core spray system 119 and a low-pressure core spray system 120 that also acts as the residual heat removal system. These operate together with a containment spray 121. The emergency core coolant system uses a condensate storage tank 122 or the pressure control pool 104 as a water source and supplies water into the core 101 by the rotation of a centrifugal pump driven by power supplied from emergency diesel generators 123, or sprays the water into the reactor container 106.

During an emergency, a boric acid solution is dumped in by an SLC (Standby Liquid Control System) pump 125 from a SLCS tank 124 into a lower plenum of the reactor pressure vessel.

In an advanced boiling-water reactor (ABWR), which is an improvement on the BWR, the external recirculation piping for the reactor recirculation system of the above described BWR is removed and recirculation through the core is enabled by the provision of a jet pump that is smaller than an internal pump, instead. The employment of an internal pump has various effects, such as a reduction in the pressure losses with respect to the flow of reactor coolant, in comparison with a BWR.

A cross-sectional view illustrating the concept of the systems of this ABWR is shown in FIG. 28. A core 52 that is provided with a large number of fuel rod assemblies is disposed slightly below the center of a reactor presure vessel 51. A large number of control rod guidance tubes 53 are provided below this core 52, and an upper aperture of a shroud 54 that shapes the core 52 is closed by a shroud head 55. Stand pipes 57 of steam separators 56 are erected above the shroud head 55, and flat, rectangular steam dryers 58 are disposed above the steam separators 56.

A control rod drive mechanism 59 is provided in a lower portion of the presure vessel 51, to drive the cross-shaped control rods within the core 52, using the inner surfaces of the control rod guide tubes 53. A plurality of internal pumps 60 are disposed in a base portion between the inner side of the reactor presure vessel 51 and the outer side of the shroud 54.

The core 52 is supported by a core support plate 61 that supports a lower portion of the large number of fuel rod assemblies, an upper portion thereof is supported by an upper lattice plate 62, and the entire core is surrounded by the shroud 54. A main steam line 108 that sends steam that has been dried by the steam dryers 58 to a turbine is connected to the reactor presure vessel 51. Coolant flowing into the reactor pressure 51 from a feedwater line 113 is recirculated by the internal pumps 60.

The reactor presure vessel 51 is mounted on and fixed to a pedestal, with a support skirt 63 therebetween. An upper aperture of the reactor presure vessel 51 is hermetically sealed by an upper lid 64.

A cross-sectional view of one of the steam separators 56 disposed within the reactor presure vessel 51 is shown in FIG. 29. This steam separator 56 comprises swirl vanes 41 provided above each of the stand pipes 57 to impart a swirling motion to a two-phase flow of steam-water mixtures, and steam separator stages 42$a$, 42$b$, and 42$c$ provided above the swirl vanes in three consecutive stages in the axial direction as steam separator means for separating the steam from the two-phase liquid-vapor flow. Each of the steam separator stages 42$a$, 42$b$, or 42$c$ has a double structure of a revolving tube 43$a$, 43$b$, or 43$c$ with an outer tube 44$a$, 44$b$, or 44$c$ positioned on the outer sides thereof. There is a hook-shaped pickoff ring 45$a$, 45$b$, or 45$c$ formed on an upper portion of each of the outer tubes 44$a$, 44$b$, and 44$c$, respectively.

The description now turns to the operation of the steam separator 56. Coolant that has been boiled off by the heat of the fission reaction forms a two-phase liquid-vapor flow in which ordinary water and steam are mixed. It is distributed between the steam separators 56, which normally number between 200 and 300, and rises to the stand pipes 57. As shown in FIG. 29, the coolant within the stand pipes 57 forms a fluidized state called an annular flow. In other words, a liquid layer 48 covers the inner wall surface of each stand pipe 57 and a mixture of water droplets 49 and steam 50 flows within this liquid layer 48.

A centrifugal force is forcibly imparted to the two-phase flow rising through the stand pipe 57 by the swirl vanes 41 disposed directly above the stand pipe 57, to turn it into a rotating flow. At this point, the liquid-vapor density ratio of the coolant under normal operating conditions of the boiling-water reactor is 1:21, and thus a useful difference is generated in the centrifugal forces that are imparted by the rotational action to each of the vapor phase and the liquid phase.

This ensures that the low-density steam is positioned towards the center of the lowermost steam separator stage 42a, the high-density liquid forms the liquid layer 48 along the inner wall surface of the revolving tube 43a of this steam separator stage 42a, and both rise while rotating. This liquid layer 48 is carried upward along the inner wall of the revolving tube 43a against its own weight by the shear forces of the high-speed rotating flow near the center and is captured by the pickoff ring 45a which is a slit having a width that is designed to be substantially equal to the thickness of this liquid layer 48. Then, a thin annular portion between the concentric tubes 43a and 44a falls under its own weight. A breakdown ring 47 is provided partway along this flow path to prevent the intermixing of a large quantity of vapor bubbles, and the flow is sent on at a slower speed to an upper downcomer where it mixes with the surrounding liquid.

The larger part of the liquid phase that has not been captured by the lowermost steam separator stage 42a is captured by the pickoff rings 45b and 45c of the subsequent steam separator stages 42b and 42c.

Note that the apparatus is designed in such a manner that approximately 90% of the moisture extracted by the steam separator 56 from the steam passing through the steam separator 56 is removed by the lowermost steam separator stage 42a, and the mass ratio of water amidst the two-phase flow at the outlet of the steam separator 56 is suppressed to no more than 10%. More of the moisture in the steam that has passed through the steam separator 56 is removed by the steam dryer 58 disposed above each steam separator 56.

A steam injector has recently attracted attention as a static jet pump to be used instead of the prior-art rotary pump. This steam injector has a compact structure, requires no power source for operation, and can also be made to have a discharge pressure that is higher than the steam pressure at the inlet thereof.

An objective of the present invention is to make full use of the above characteristics in the application of a steam injector to a steam separator, to provide a steam separator which achieves substantially the same liquid-vapor separation effect as that of the above prior-art steam separator, and, at the same time, provide a higher discharge pressure.

The recirculation method currently used in BWRs and ABWRs necessitates components such as a large-scale pump, which is a rotating mechanism, and a large-capacity inverter power source for controlling that pump. From various viewpoints such as structural cost, material resources, and regularly scheduled maintenance, this method increases the cost of the plant and causes breakdowns in the rotating mechanisms. In contrast thereto, a movement has recently been seen to implement a simplified BWR with a modified natural recirculation method for the core that does not require jet pumps and internal pumps. Because the electrical output thereof is small in comparison to the size of the plant, the construction costs and unit-power costs tend to increase.

In a similar manner, it has become possible to design smaller, simpler equipment in pressurized water reactors (PWRs) and fast breeder reactors (FBRs) as well, by reinforcing the natural recirculation forces within steam generators. This is not limited to reactors; there is also a large demand for smaller, simpler installations having processes that separate out a liquid phase comprised within steam, such as boilers.

SUMMARY OF THE INVENTION

The present invention was devised in the light of the above described problems of the prior art, and has as an objective the implementation of a steam separator wherein a discharge pressure is higher than the steam pressure at the inlet thereof, by using an injector type of steam separator instead of the steam separator of the prior art.

Another objective of the present invention is to implement a great simplification of the equipment installed around the core of a reactor, by applying an injector type of steam separator, i.e., a separator/injector, to a nuclear power generation plant and by achieving both an increase in the performance of the steam separator for a two-phase flow at the core outlet and the establishment of a forced circulation in the core.

A further objective of the present invention is to reduce the flow-rate of a recirculation pump of a boiler apparatus, and thus implement a simpler overall structure, by applying an injector type of steam separator to the boiler apparatus to convert the heat exchanger thereof from a natural circulatory system to a forced circulatory system.

In order to achieve the above objectives, a first aspect of the present invention relates to a steam separator equipped with a separator/injector, wherein the separator/injector comprises: a two-phase flow accelerator nozzle having an inlet portion opening towards a source of a two-phase liquid-vapor flow and an outlet portion positioned higher than the inlet portion, for causing an acceleration of the two-phase liquid-vapor flow that flows into an interior portion thereof from the inlet portion and discharging the same from the outlet portion; a liquid-phase capture means connected to the outlet portion of the two-phase flow accelerator nozzle and having a guide wall formed as an inverted U-shape curve, in such a manner that the two-phase flow of steam-motor mixture that is discharged from the outlet portion of the two-phase flow accelerator nozzle is guided along a wall surface of the guide wall but is also capable of separating therefrom, wherein a difference in centrifugal forces that are imparted to a vapor-phase component and a liquid-phase component of the two-phase flow while the two-phase flow is being guided along the guide wall causes the liquid-phase component to be guided along the wall surface of the guide wall and be captured, whereas the vapor-phase component is allowed to separate from the guide wall; and a diffuser into which the liquid-phase component captured by the liquid-phase capture means is allowed to flow, which increases the pressure of the liquid-phase component as the liquid-phase component flows therethrough, and which discharges the liquid-phase component from an outlet side thereof.

With this configuration, the two-phase flow of steam and water are accelerated by the two-phase flow accelerator nozzle, a strong centrifugal force is applied thereto, and thus the vapor and liquid are separated. In other words, the high-density water flows at substantially constant speed along the flowpath formed by the liquid-phase capture means, but the low-density steam separates from this flowpath, is released into a vapor space, and moves above the separator/injector. The water (liquid phase) that has flowed along the flowpath then flows into the diffuser, is decelerated (in accordance with the Bernoulli principle) as the cross-sectional area of the flowpath increases within the diffuser, and is then discharged out of the separator/injector through a diffuser outlet. During this time, the pressure of the discharge water is increased by the diffuser, so that the outlet pressure of the separator/injector can be made higher than the inlet pressure thereof.

The nuclear power generation plant of a second aspect of the present invention is further provided with a foundation portion such that the separator/injector is erected upon the foundation portion, wherein the foundation portion comprises an upper plate and a lower plate positioned below the upper plate to form a space therebetween; the configuration being such that the inlet portion of the two-phase flow accelerator nozzle communicates with a space positioned below the lower plate, and the outlet side of the diffuser communicates with the space formed between the upper and lower plates. This provides complete separation between the two-phase flow that enters the separator/injector and the discharge water from the separator/injector.

In a third aspect of this invention, the wall surface of the guide wall of the liquid-phase capture means is preferably formed in an arch-shaped curve orientated upward and at least one portion thereof is in the shape of a circular or elliptical arc. In addition, a side edge portion of the guide wall of the liquid-phase capture means is preferably bent in a direction to enclose the two-phase flow, so that the liquid phase does not flow out of the separator/injector from the underside of the flowpath.

In a fourth aspect of this invention, riblet grooves are formed in the flow direction of the two-phase flow or the liquid-phase flow along at least one portion of an inner wall surface of the two-phase flow accelerator nozzle, the wall surface of the guide wall of the liquid-phase capture means, and an inner wall surface of the diffuser. This makes it possible to reduce frictional losses in the fluid in the vicinity of the inner wall surfaces.

In a fifth aspect of this invention, the steam separator preferably further comprises an outer tube having an axis in the vertical direction comprising the separator/injector within the outer tube and an inner tube having an axis in the vertical direction disposed within the outer tube; wherein: the wall surface of the guide wall of the liquid-phase capture means is formed by part of an inner wall surface of the inner tube; the diffuser is formed to be in contact with an inner wall of the inner tube; and a space is formed between an inner wall of the outer tube and an outer wall of the inner tube in such a manner that the liquid-phase component discharged from the outlet side of the diffuser is capable of flowing therethrough. In this case, the lower portion of the two-phase flow accelerator nozzle is formed along the axial line of the inner tube, the outlet portion of the two-phase flow accelerator nozzle is formed in the vicinity of an inner wall of the inner tube, and the diffuser is formed in a helical shape with respect to the axial line of the inner tube. This configuration ensures that a centrifugal force is imparted to the two-phase flow discharged from the two-phase flow accelerator nozzle as it flows along the helical flowpath in the vicinity of the inner wall surface of the inner tube, the high-density water flows into the diffuser while being pressed against the inner wall surface, and the low-density steam is separated out towards the center in the axial direction and rises. Thus the two-phase flow is separated into liquid and vapor.

The present invention also provides a nuclear power generating system in which this separator/injector is mounted.

In other words, the fifth aspect of the present invention relates to a nuclear power generation plant using a boiling-water reactor, wherein the nuclear power generation plant comprises: a reactor pressure vessel; a plurality of fuel rod assemblies disposed within the reactor pressure vessel and through which a coolant flows; a shroud surrounding the plurality of fuel rod assemblies, within which is comprised a two-phase liquid-vapor flow that is created as the coolant flows within the plurality of fuel rod assemblies, and which is sealed by a shroud head at an upper end thereof; and a separator/injector erected above the shroud head; wherein the separator/injector comprises: a two-phase flow accelerator nozzle having an inlet portion opening towards the interior of the shroud and an outlet portion positioned higher than the inlet portion, for causing an acceleration of the two-phase liquid-vapor flow generated in the shroud that flows into an interior portion thereof from the inlet portion and discharging the same from the outlet portion; a liquid-phase capture means connected to the outlet portion of the two-phase flow accelerator nozzle and having a guide wall formed as an inverted U-shape curve, in such a manner that the two-phase liquid-vapor flow that is discharged from the outlet portion of the two-phase flow accelerator nozzle is guided along a wall surface of the guide wall but is also capable of separating therefrom, wherein a difference in centrifugal forces that are imparted to a vapor-phase component and a liquid-phase component of the two-phase flow while the two-phase flow is being guided along the guide wall causes the liquid-phase component to be guided along the wall surface of the guide wall and be captured, whereas the vapor-phase component is allowed to separate from the guide wall; and a diffuser into which the liquid-phase component captured by the liquid-phase capture means is allowed to flow, which increases the pressure of the liquid-phase component as the liquid-phase component flows therethrough, and which discharges the liquid-phase component from an outlet side thereof.

During this time, recirculation is performed within the reactor by returning increased-pressure coolant that flows out of the diffuser back into the shroud. The wall surface of the guide wall of the liquid-phase capture means is preferably formed to be a smooth curve.

The above configuration ensures that the two-phase flow is accelerated by the two-phase flow accelerator nozzle, the liquid phase thereof is subjected to a strong centrifugal force and is separated thereby, the water (liquid phase) then flows into the diffuser, is decelerated (in accordance with the Bernoulli principle) as the cross-sectional area of the flowpath increases within the diffuser, and the pressure thereof is increased, creating a recirculation drive force.

In a sixth aspect of the present invention, the shroud head is formed as a double structure having an upper shroud head and a lower shroud head which is positioned below the upper shroud head to form a space between the upper and lower shroud heads; the inlet portion of the two-phase flow accelerator nozzle communicates with a space within the shroud that is positioned below the lower shroud head; and the outlet portion of the diffuser communicates with the space formed between the upper and lower shroud heads.

The nuclear power generation plant of a seventh aspect of the present invention is further provided with a jet pump drive nozzle disposed in an upper portion of a downcomer portion surrounding the shroud; and a jet pump provided below the jet pump drive nozzle; wherein the configuration could be set in such a manner that, after the coolant discharged from the diffuser has passed through the space formed between the upper and lower shroud heads, the coolant is guided into the jet pump through the jet pump drive nozzle. The recirculatory force of the discharge water from the separator/injector makes it possible to reduce the number of jet pumps used in the prior art.

In an eighth aspect of the present invention, a pipeline that branches off from a feedwater pipeline that links the reactor pressure vessel to a feedwater pump is connected to the jet pump drive nozzle. This makes it possible to supply water from the feedwater pump through the jet pump drive nozzle to the jet pump.

If necessary, the nuclear power generation plant also comprises a feedwater pump for supplying water to the reactor pressure vessel; a feedwater pipeline linking the reactor pressure vessel to the feedwater pump; and a branch pipeline branching off from the feedwater pipeline and communicating with the jet pump drive nozzle, wherein the feedwater pump supplies water to the jet pump through the branch pipeline and the jet pump drive nozzle.

In a nuclear power generation plant of a ninth aspect of this invention, pressure is increased to control the circulation flow-rate in sequence from the interior of the downcomer portion, the interior of the shroud, the inlet portion of the separator/injector, to the outlet portion of the separator/injector by controlling the flow-rate and discharge pressure of water supplied from the feedwater pump to the jet pump, thereby controlling the thermal output generated within the reactor pressure vessel. This makes it possible to increase the pressure in sequence from the downcomer portion, a lower plenum, the core, an upper plenum, the inlet portion of the separator/injector, to the outlet portion of the separator/injector by, for example, increasing the flow-rate and discharge pressure of water supplied from the feedwater pump to the jet pump, to increase the core circulation flow-rate, thereby controlling the thermal output of the core.

In a tenth aspect of the present invention, the jet pump could be driven at the start-up of the plant by mixing a flow of feedwater supplied from at least one of a pump in a residual heat removal system and a pump in a reactor water clean-up system with a flow of feedwater supplied from the feedwater pump to the jet pump.

The nuclear power generation plant of an eleventh aspect of this invention further comprises a recirculation flow-rate control valve disposed in the outlet portion or the inlet portion of the jet pump; and a flow-rate control means that uses at least one of an electrical generator output signal, a main steam flow-rate signal, a neutron flux output signal, and a jet pump pressure difference signal as an input signal, calculates a suitable recirculation flow-rate and corresponding degree of opening of the recirculation flow-rate control valve therefrom, and outputs a valve-opening signal. This adjusts the recirculation flow-rate of the core in accordance with the setting and adjustment of the degree of opening of the valve as appropriate in accordance with the electrical output required of the nuclear power generation plant.

The nuclear power generation plant of a twelfth aspect of this invention further comprises a feedwater pump for supplying water to the reactor pressure vessel; a feedwater line connected to the reactor pressure vessel to the feedwater pump; a flow-rate adjustment valve provided in the feedwater pipeline; and a branch pipeline branching off from the feedwater pipeline and communicating with the jet pump drive nozzle, wherein the flow-rate control means controls a water level of the reactor by calculating a suitable degree of opening of the flow-rate adjustment valve and outputting a valve-opening signal to the flow-rate adjustment valve. This monitoring and control of the water level of the nuclear reactor makes it possible to maintain the core water level to be substantially constant. Alternatively, the flow-rate control means could control the flow-rate of water supplied to the reactor by calculating a suitable feedwater flow-rate and outputting a rotational frequency signal to the feedwater pump.

The nuclear power generation plant of a thirteenth aspect of the present invention further comprises a jet pump drive nozzle disposed in an upper portion of a downcomer portion surrounding the shroud; a bell mouth opening towards the downcomer portion in close proximity to the jet pump drive nozzle; a straight pipe having one end connected to a leading edge of the bell mouth and another end connected to an inlet side of the jet pump; and a jet pump provided below the jet pump drive nozzle; wherein after the coolant, which has accumulated in the upper shroud head without passing through the diffuser, has passed through the bell mouth and the straight pipe via the jet pump drive nozzle, the coolant is guided into the jet pump. This configuration imparts a recirculatory drive force of the coolant flowing through the downcomer portion.

A fourteenth aspect of the present invention relates to an ABWR characterized in that the shroud head is formed as a double structure having an upper shroud head and a lower shroud head which is positioned below the upper shroud head to form a space between the upper and lower shroud heads; and the ABWR is further provided with: a downcomer pipe having an upper end portion opening upwards in an upper surface of the upper shroud head, for guiding downwards a liquid phase of coolant that has accumulated on the upper surface of the upper shroud head, without being captured by the liquid-phase capture means; an impeller provided in a lower portion of the downcomer pipe for rotating in such a manner that coolant flowing downward within the downcomer pipe is discharged towards a lower portion of the shroud; and an internal pump for driving the impeller; wherein the outlet side of the diffuser communicates with a space formed between the upper and lower shroud heads, and coolant that is discharged from the outlet side of the diffuser flows down through the space formed between the upper and lower shroud heads and into a downcomer portion on an outer side of the downcomer pipe, then is discharged to a lower portion of the shroud.

The nuclear power generation plant of a fifteenth aspect of this present invention further comprises a recirculation flow-rate control means that uses at least one of an electrical generator output signal, a main steam flow-rate signal, a neutron flux output signal, and a core support plate pressure difference signal as an input signal, calculates a suitable recirculation flow-rate and a suitable rotational frequency of the impeller therefrom, and outputs a suitable rotational-frequency signal with respect to the internal pump. This configuration adjusts the recirculation flow-rate in the core by setting and regulating the rotational frequency of the pump as appropriate in accordance with the electrical output required of the nuclear power generation plant.

The recirculation flow-rate control means controls the rotational frequency of the internal pump by performing calculations in accordance with overall proportional integral differential (PID) control relating to a difference from a predetermined water level based on an input reactor core water-level signal. This makes it possible to control the rotational frequency of the internal pump to maintain the core water level to be substantially constant.

The nuclear power generation plant of a sixteenth aspect of the present invention is further characterized in that each of a shroud casing forming a side portion of the shroud and a core support plate forming a lower portion of the shroud is formed as a double structure; and the plant further comprises a first coolant circulation pathway formed so as to mutually communicate the space between the shroud heads, a space formed between the double shroud casings, and a space formed between the double core support plates, through which flows coolant discharged from the outlet portion of the diffuser; a water rod provided in the interior of the fuel rod assemblies, within which coolant flows; a first coolant guide pipe formed so as to communicate the first coolant circulation pathway with an outlet portion at a lower end of the water rod, for guiding increased-pressure coolant, which has been discharged from the outlet side of the diffuser and which is flowing through the first coolant circulation pathway, to the outlet portion at the lower end of the water rod; and a hole formed in a side surface of the water rod, for ejecting coolant that is flowing within the water rod to the exterior of the water rod. This configuration makes it possible to cause an increase in the liquid-phase flow-rate of the two-phase flow in the core, by allowing the high-pressure discharge water from the separator/injector to flow into the fuel rod assemblies.

In the nuclear power generation plant of a seventeenth aspect of the present invention, the coefficient of thermal expansion of the material configuring the first coolant guide pipe and the coefficient of thermal expansion of the material configuring the water rod are set to be different in the vicinity of a connective portion between the first coolant guide pipe and the water rod.

In the nuclear power generation plant of an eighteenth aspect of the present invention, labyrinth grooves are provided in the first coolant guide pipe and the water rod in the vicinity of a connective portion between the first coolant guide pipe and the water rod. This prevents leakage of the coolant by increasing the resistance of the flowpath of leaking coolant.

The nuclear power generation plant of a nineteenth aspect of the present invention further comprises a second coolant guide pipe provided within a control rod tube positioned below the fuel rod assemblies, for guiding coolant that is outside the shroud into a lower tie plate of the fuel rod assemblies; and an orifice provided in a second coolant circulation path that is formed by the second coolant guide pipe, for locally constricting the flowpath thereof. This suppresses any increase in the pressure losses in the coolant flowpath.

In a nuclear power generation plant of a twentieth aspect of the present invention, holes are provided in a side surface of an inner shroud casing of the double shroud casings, and a side surface of a channel box of the fuel rod assemblies. This makes it possible to even out the coolant density within the fuel rod assemblies.

A twenty-first aspect of the present invention relates to a nuclear power generation plant using a boiling-water reactor, wherein the nuclear power generation plant comprises: a steam generator comprising a lower casing surrounding a heat exchanger formed of heat-exchange pipes having inlets and outlets for a primary coolant, and an upper casing provided connected to the lower casing and having a steam outlet for supplying steam to a turbine; a reactor container communicating with the steam generator and surrounding the primary coolant and a fuel rod assembly; and a separator/injector provided above the lower casing; wherein the separator/injector comprises a two-phase flow accelerator nozzle having an inlet portion opening towards the interior of the lower casing and an outlet portion positioned higher than the inlet portion, for causing an acceleration of a two-phase flow of the primary coolant that flows into an interior portion thereof from the inlet portion and discharging the same from the outlet portion; a liquid-phase capture means connected to the outlet portion of the two-phase flow accelerator nozzle and having a guide wall formed as a inverted U-shape curve, in such a manner that the two-phase flow that is discharged from the outlet portion of the two-phase flow accelerator nozzle is guided along a wall surface of the guide wall but is also capable of separating therefrom, wherein a difference in centrifugal forces that are imparted to a vapor-phase component and a liquid-phase component of the two-phase flow while the two-phase flow is being guided along the guide wall causes the liquid-phase component to be guided along the wall surface of the guide wall and be captured, whereas the vapor-phase component is allowed to separate from the guide wall; and a diffuser into which the liquid-phase component captured by the liquid-phase capture means is allowed to flow, which increases the pressure of the liquid-phase component as the liquid-phase component flows therethrough, and which discharges the liquid-phase component from an outlet side thereof. In this case, it is preferable that the nuclear power generation plant further comprises an inner casing surrounding the heat exchanger within the lower casing; wherein discharge water exhausted from the diffuser is guided into the heat exchanger through a space formed between the lower casing and the inner casing. This makes it possible to improve the heat-transfer characteristics by creating a forced circulation of fluid on a secondary side in the steam generator of this PWR.

A twenty-second aspect of the present invention relates to a boiler apparatus comprising: a pressure vessel surrounding heat-transfer tubes that configure a heat exchanger and a combustor for heating the heat-transfer tubes; a recirculation pump for recirculating a fluid that flows through the pressure vessel; and a separator/injector provided above the heat-transfer tubes; wherein the separator/injector comprises a two-phase flow accelerator nozzle having an inlet portion opening towards the interior of the pressure vessel and an outlet portion positioned higher than the inlet portion, for causing an acceleration of a two-phase liquid-vapor flow that flows into an interior portion thereof from the inlet portion and flows through the heat exchanger, and discharging the same from the outlet portion; a liquid-phase capture means connected to the outlet portion of the two-phase flow accelerator nozzle and having a guide wall formed as a inverted U-shape curve, in such a manner that the two-phase flow that is discharged from the outlet portion of the two-phase flow accelerator nozzle is guided along a wall surface of the guide wall but is also capable of separating therefrom, whereby a difference in centrifugal forces that are imparted to a vapor-phase component and a liquid-phase component of the two-phase flow while the two-phase flow is being guided along the guide wall causes the liquid-phase component to be guided along the wall surface of the guide wall and be captured, whereas the vapor-phase component is allowed to separate from the guide wall; and a diffuser into which the liquid-phase component captured by the liquid-phase capture means is allowed to flow, which increases the pressure of the liquid-phase component as the liquid-phase component flows therethrough, and which discharges the liquid-phase component from an outlet side thereof. This makes it possible to cause a reduction in the flow-rate of the recirculation pump by creating a forced circulation of fluid within the boiler.

The configuration of the present invention enables the following effects. In other words, it makes it possible to implement a steam separator that is equipped with a separator/injector that enables an outlet pressure that is higher than the inlet pressure thereof, in addition to the steam separation capability of the prior art.

Installing this separator/injector in a nuclear power generation plant or boiler apparatus makes it possible to separate steam and water from a two-phase flow and achieve a forced circulation in the core, without requiring the complicated configuration of the prior art. This means that the number of items of dynamic recirculation equipment required in the art, such as recirculation pumps or internal pumps, can be reduced, which leads to a huge reduction in the equipment and structural resources of the entire apparatus, rationalization and simplification of the apparatus, and also a reduction in the time and costs involved in construction and maintenance.

BRIEF DESCRIPTION OF THE DRAWINGS

FIG. 1 is a perspective view of a steam separator in accordance with a first embodiment of this invention;

FIG. 6(a) is a cross-sectional view through the wall surface that forms the liquid-phase capture means of the separator/injector of FIG. 1, and FIGS. 6(b), 6(c) and 6(d) are further cross-sectional views of variations on the liquid-phase capture means of FIG. 6(a);

FIG. 15 is a schematic cross-sectional view of essential components of another nuclear power generation plant in accordance with this sixth embodiment;

DESCRIPTION OF PREFERRED EMBODIMENTS

First Embodiment

Figure 2:
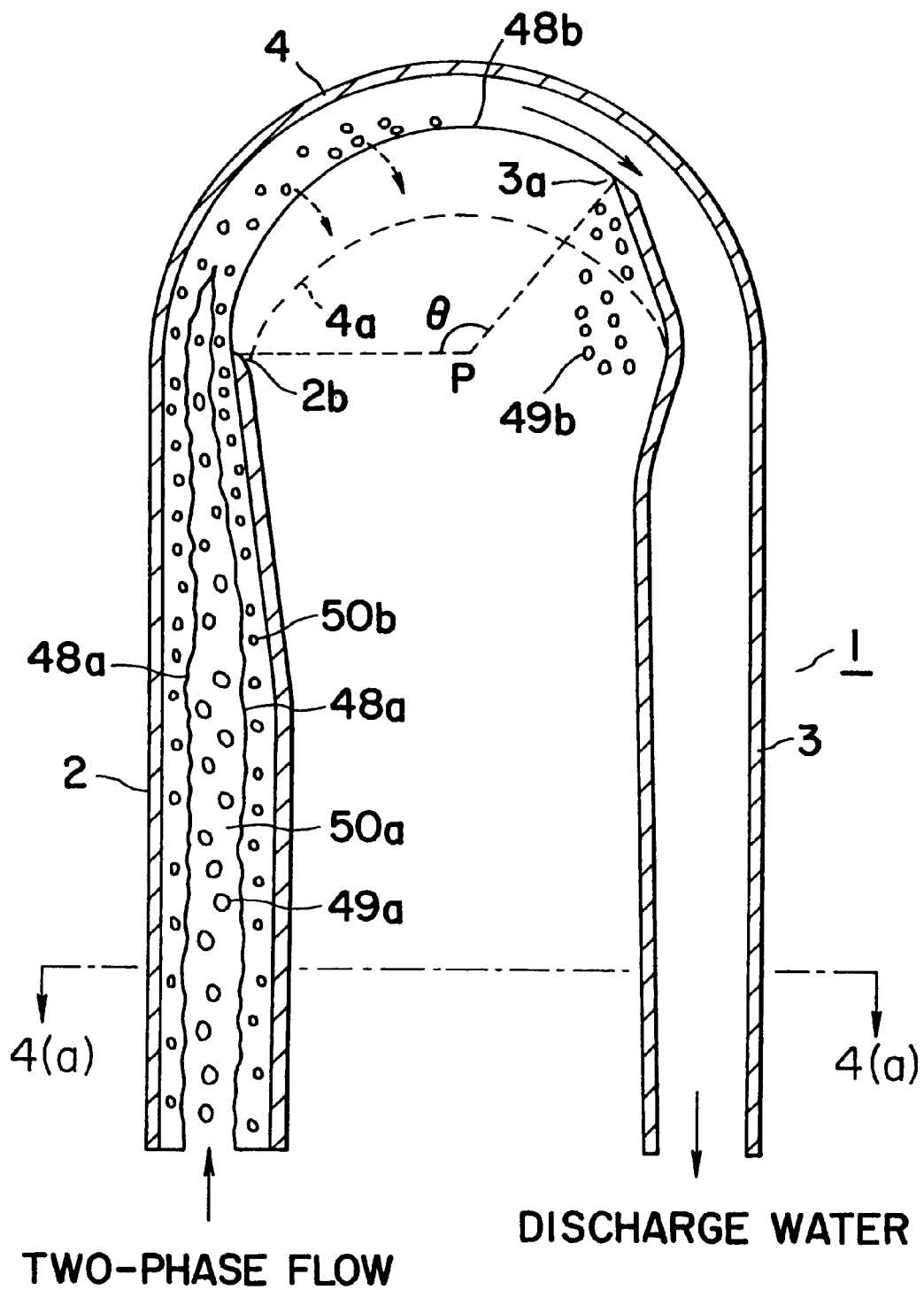
FIG. 2 is a schematic cross-sectional view illustrating the flow of the mixed vapor and liquid phases in the steam separator of this first embodiment.

A first embodiment of the present invention is described below with reference to the accompanying drawings. Note that components thereof that are the same as those in the above description of the prior art are given the same reference numbers and further description thereof is omitted. A steam separator relating to this embodiment is constructed of a separator/injector having a high-speed nozzle and a diffuser. A perspective view of this steam separator is shown in FIG. 1. This steam separator 1 is erected on plates 10a and 10b that form a double-plate structure, a two-phase liquid-vapor flow is drawn in from below the lower plate 10b of this double wall, the vapor and liquid therein are separated by an action that will be described later, and the liquid phase alone is exhausted through a space between the double plates 10a and 10b.

The rising two-phase flow passes through a stand pipe 57 provided between the double plates 10a and 10b is introduced into a two-phase flow accelerator nozzle 2 that is provided directly above the stand pipe 57. The two-phase flow accelerator nozzle 2 has a configuration in which the duct area thereof narrows as the two-phase flow rises from a flow inlet 2a, so that an accelerated two-phase flow is ejected from a discharge outlet 2b at the upper end thereof.

A diffuser 3 is provided in close proximity to the two-phase flow accelerator nozzle 2. The diffuser 3 has a configuration such that a liquid-phase component flows into it from a flow inlet 3a positioned at an upper edge thereof, the duct area thereof increases from there on downward, and the liquid-phase component is discharged from a discharge outlet 3b at a lower edge thereof after being decelerated and having its pressure increased.

A rectangular plate 4, which is formed to have a curved-wall shape with a smooth inner wall surface, links the discharge outlet 2b side of the two-phase flow accelerator nozzle 2 and the flow inlet 3a side of the diffuser 3, in order to capture the liquid phase of the two-phase flow. This rectangular plate 4 is disposed in an arch shape as the two ends of the two-phase flow accelerator nozzle 2 and the diffuser 3, and the discharge outlet of the two-phase flow accelerator nozzle 2 and the flow inlet of the diffuser 3 are connected externally thereby. In other words, the discharge outlet 2b of the two-phase flow accelerator nozzle 2 and the flow inlet 3a of the diffuser 3 are disposed adjacent to one side of the plate 4. This ensures that the vicinity of the inner wall surface of the arched plate 4 acts as a flowpath for the two-phase flow that is blown out from the two-phase flow accelerator nozzle 2 and drawn into the diffuser 3. This plate 4 functions as a means for capturing the liquid phase from the two-phase liquid-vapor flow, as will be described later.

Side plates 4a are provided along the two side edge portions of this plate 4 to cover the edge surfaces of the plate 4, in order to send the captured liquid phase reliably into the diffuser 3. In other words, the edge portions of the plate 4 are curved into the flowpath side of the two-phase flow, and these curved portions 4a prevent the liquid phase of the two-phase flow from being discharged outward.

This separator/injector 1 is characterized in that the lower portions of the two-phase flow accelerator nozzle 2 and the diffuser 3, in other words, the flow inlet 2a side of the two-phase flow accelerator nozzle 2 and the discharge outlet 3b side of the diffuser 3, are formed to be substantially circular. In addition, the flow inlet 2a of the two-phase flow accelerator nozzle and the stand pipe 57 are formed integrally. The discharge outlet 3b of the diffuser 3 opens into and is connected to the upper plate 10a.

Another characteristic thereof is the way in which the inner wall of the plate 4 is formed as a smooth curve. This ensures that there is no sudden change in angle of the liquid phase as it flows over this inner wall surface.

A schematic cross-sectional view illustrating the flow of the mixed vapor and liquid phases within the separator/injector 1 of this embodiment is shown in FIG. 2. The operation of the steam separation provided by this embodiment will now be described with reference to this figure. Note that plate 4, which is formed in an arch shape, is shaped to have a cross-section that is an arc of a circle.

The point denoted by P in this figure is the center of the arc of the portion of the rectangular plate 4 formed into an arc, and θ denotes the angle subtended by a line joining the point P to the discharge outlet 2b at the discharge end of the two-phase flow accelerator nozzle 2 and a line joining the point P to a leading edge portion of the flow inlet 3a of the diffuser 3, which is formed as a sharp edge. This angle θ is ideally within the range of 90 degrees to 180 degrees, but this figure shows an angle of 135 degrees, which is thought to be particularly suitable. The side plate 4a of the plate 4 that connects the two-phase flow accelerator nozzle 2 and the diffuser 3 is indicated by a broken line in this figure.

The two-phase flow rising within the stand pipe 57 is accelerated to several tens of m/s as it rises into the inlet portion of the two-phase flow accelerator nozzle 2. The low-density steam component of the two-phase flow is positioned in the center in the axial direction of the two-phase flow accelerator nozzle 2, as denoted by 50a in the figure, the high-density liquid forms a liquid layer 48a along the inner wall surface of the two-phase flow accelerator nozzle 2, and both continue to rise. There is a small quantity each of air bubbles 50b within the liquid layer 48a and water droplets 49a within the steam 50a.

The two-phase flow discharged by the discharge outlet 2b of the two-phase flow accelerator nozzle 2 is introduced into the vicinity of the inner wall surface of the plate 4 that is provided extending from this discharge outlet 2b. The liquid phase component of the two-phase flow that has passed through the two-phase flow accelerator nozzle 2 flows along the inner wall surface of the plate 4, which acts as a liquid-phase capture means, while forming a liquid layer 48b along this plate 4, as shown by the solid arrow in the figure. The liquid phase component flows into the diffuser 3. During this time, the sharp-edged flow inlet 3a of the diffuser 3 ensures that the liquid that forms the liquid layer 48b flows reliably into the diffuser 3. The air bubbles 50b within the liquid layer 48a drop downward during the passage along the inner wall surface of the plate 4, as shown by broken arrows in the figure, escape under the side plates 4a at the edge portions of the plate 4, and move to above the separator/injector 1. The cross-sectional surface of the plate 4 is formed over a smooth curve so that the flowpath of the liquid phase that flows in the vicinity of the inner wall surface of this plate 4, which extends over a certain angle, is not subjected to abrupt changes, and thus substantially all of the liquid is introduced into the diffuser 3. As it passes along the plate 4, the two-phase flow is subjected to a strong centrifugal force and becomes a rotating flow.

The plate 4 ensures that only the liquid phase of the two-phase flow is introduced into the diffuser 3 as it flows over the inner wall surface of the plate 4, and also the vapor phase is prevented from flowing into the diffuser 3, so that the liquid phase alone is captured.

Since the liquid layer 48b is brought into contact with the sharp leading-edge portion of the flow inlet 3a of the diffuser 3, the most part of water droplets 49b therein is discharged out of the diffuser 3 as reflected water droplets.

Assume, for example, that the inlet pressure of the two-phase flow is 7 MPa, which is the rated pressure of a boiling-water reactor. The density PW of water is 740 kg/m3 and the density $\rho_G$ of steam is 35.7 kg/m3, and if it is assumed that the void ratio (volumetric flow ratio) $\rho_{AV}$ is 70%, the average density of the two-phase liquid-vapor flow is given by:

$$\rho_{AV} = (1-\beta)\rho_W + \beta\rho_C$$

$$= 0.3 \cdot 740 + 0.7 \cdot 35.7 = 247 [kg/m^3]$$

If the two-phase flow is accelerated by a pressure difference $\Delta P_{AN}$=0.2 MPa at the two-phase flow accelerator nozzle 2 that is 2 MPa, the relationship with the velocity is given by:

$$\Delta P_{AN} = \rho_{AV} \cdot U_{AN}^2 / 2$$

And thus:

$$u_{AN} = \sqrt{\frac{2\Delta P_{AN}}{\rho_{AV}}} = \sqrt{\frac{2 \times 0.2 \times 10^6}{247}} = 40.2 [m/s]$$

In other words, the flow is accelerated to a velocity of approximately 40 m/s.

Of the two-phase flow accelerated and ejected by the two-phase flow accelerator nozzle 2 in this manner, the high-density water component is pressed against the inner wall surface along the arch-shaped flowpath formed by the plate 4, to form a liquid layer which has a free liquid surface and which flows at substantially constant velocity within the flowpath and into the diffuser 3.

Assume that only the liquid phase of the two-phase flow ejected from the two-phase flow accelerator nozzle 2 at approximately 40 m/s after the vapor/liquid separation flows along the plate 4 that is the liquid-phase capture means, maintaining the velocity of the liquid phase, and enters the diffuser 3. If the diffuser loss $\zeta_D$ is assumed to be 0.15, the pressure rise $\Delta P_D$ due to the diffuser 3 is given by:

$$\Delta P_D = (1 - \zeta_D) \rho_W u_W^2 / 2$$
$$= (1 - 0.15) \times 740 \times 40^2 / 2$$
$$= 0.5 [\text{MPa}]$$

At the same time, since the pressure loss used in the acceleration of the two-phase flow is $\Delta P_{AN}$=0.2 MPa:

$$\Delta P_D - \Delta P_{AN} = 0.3 \text{ MPa}$$

In other words, it is clear that a core recirculation drive force equivalent to a water head of approximately 30 m is obtained by the separator/injector 1.

Figure 3:
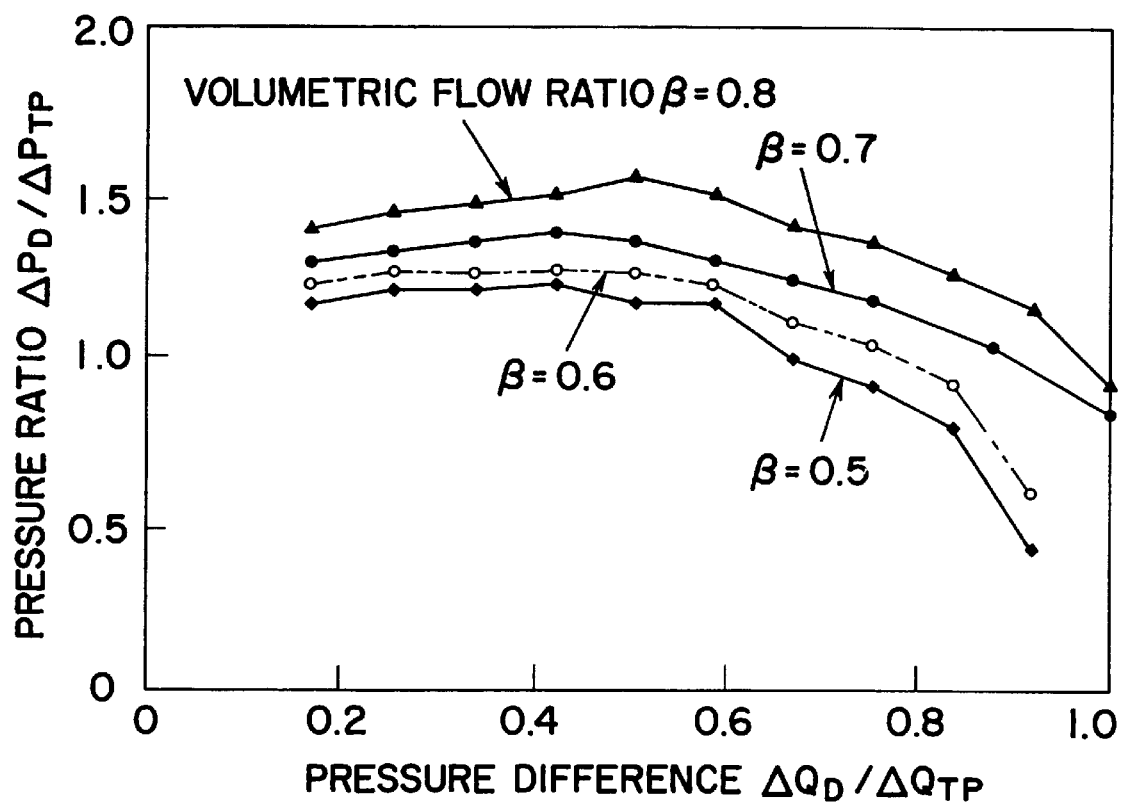
FIG. 3 is a graph showing the results of water-air tests performed with the steam separator of this first embodiment.

A graph of the results of water-air tests performed in the separator/injector 1 is shown in FIG. 3 as proof of the above. The inlet pressure when the inlet flow rate at the flow inlet 2a of the two-phase flow accelerator nozzle of the separator/injector was varied in various ways and the resultant outlet flow rate and outlet pressure at the discharge outlet 3b of the diffuser 3 were measured for four cases in which the volumetric flow ratio was between 0.5 and 0.8. The pressure ratio (output pressure divided by inlet pressure) between the inlet and outlet of the separator/injector is plotted along the horizontal axis and the flow rate ratio (outlet flow rate divided by inlet flow rate) is plotted along the vertical axis.

These results show that, when the flow rate ratio is 0.6 or less, the pressure ratio exceeded 1.0 in all cases. In other words, the discharge pressure is greater than the steam pressure at the inlet. In addition, when the flow rate ratio is between 0.2 to about 0.5, the pressure ratio is on the order of 1.2 to 1.6, proving that a high discharge pressure can be assured.

Note that the structure of this embodiment is such that the two-phase flow rises from below the lower plate 10b of the double plates, and the liquid phase that has been separated from the vapor phase flows out into the space between the double plates 10a and 10b, as shown in FIG. 1. However, the configuration is not limited to that shown in FIG. 1, provided the structure is such that the two-phase flow that flows into the separator/injector 1 and the liquid phase that flows out therefrom are completely separated into two flow paths, without mutual interference.

Figure 4A:
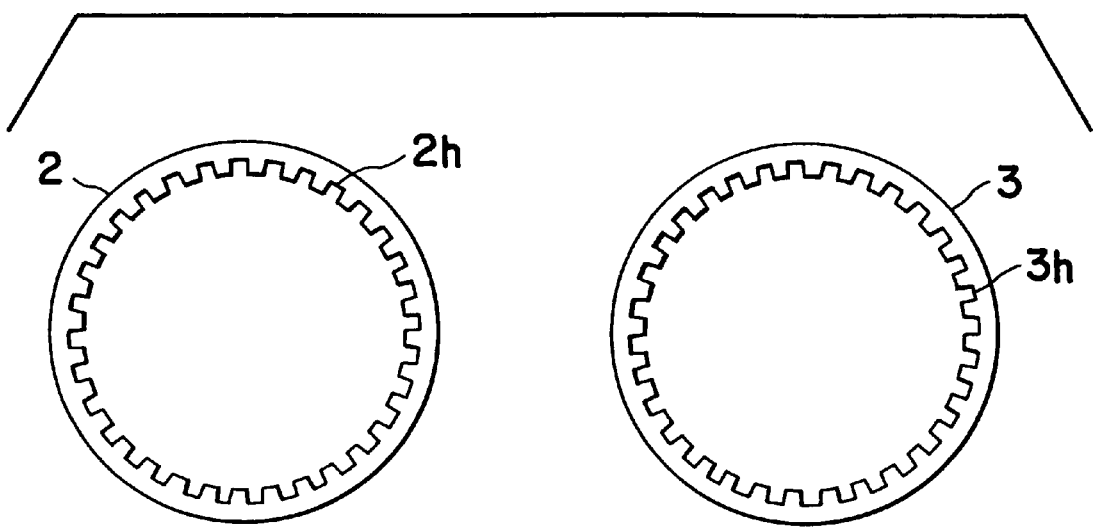
FIG. 4(a) is a cross-sectional view taken along the line 4(a)—4(a) of FIG. 2
Figure 4B:
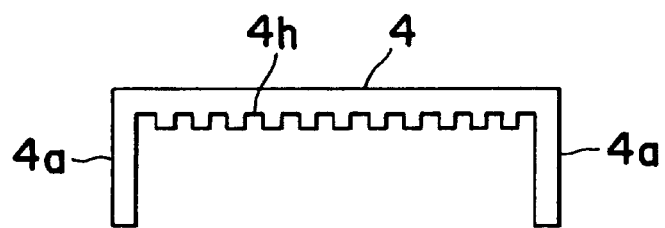
FIG. 4(b) is a radial cross-sectional view through the liquid-phase capture means of the separator/injector of FIG. 1.

Furthermore, this embodiment of the present invention can also have a structure such that riblet grooves 2h, 3h, and 4h are provided parallel to the flow direction on the two-phase flow accelerator nozzle 2, the diffuser 3, and the inner wall surface of the plate 4 that together configure the separator/injector 1. A cross-sectional view of the separator/injector 1 taken along the line 4(a)–4(b) in FIG. 2 is shown in FIG. 4a. A similar cross-sectional view taken in the radial direction of the fluid-phase capture means (the plate 4) is shown in FIG. 4b.

The width and depth of the riblet grooves in this case are determined by the Reynold's number which is a physical quantity specific to the flow of a fluid. The optimal width of the riblet grooves is that which maximizes the effect of reducing frictional resistance; more specifically it is preferably approximately 150 μm.

The provision of these narrow riblet grooves substantially parallel to the direction of flow of the fluid makes it possible to adjust the flow within the turbulent base layer by regulated vortices. This, in turn, makes it possible to reduce frictional losses due to vortices that are generated in random directions in the vicinity of wall surfaces in the prior-art apparatus.

Figure 5:
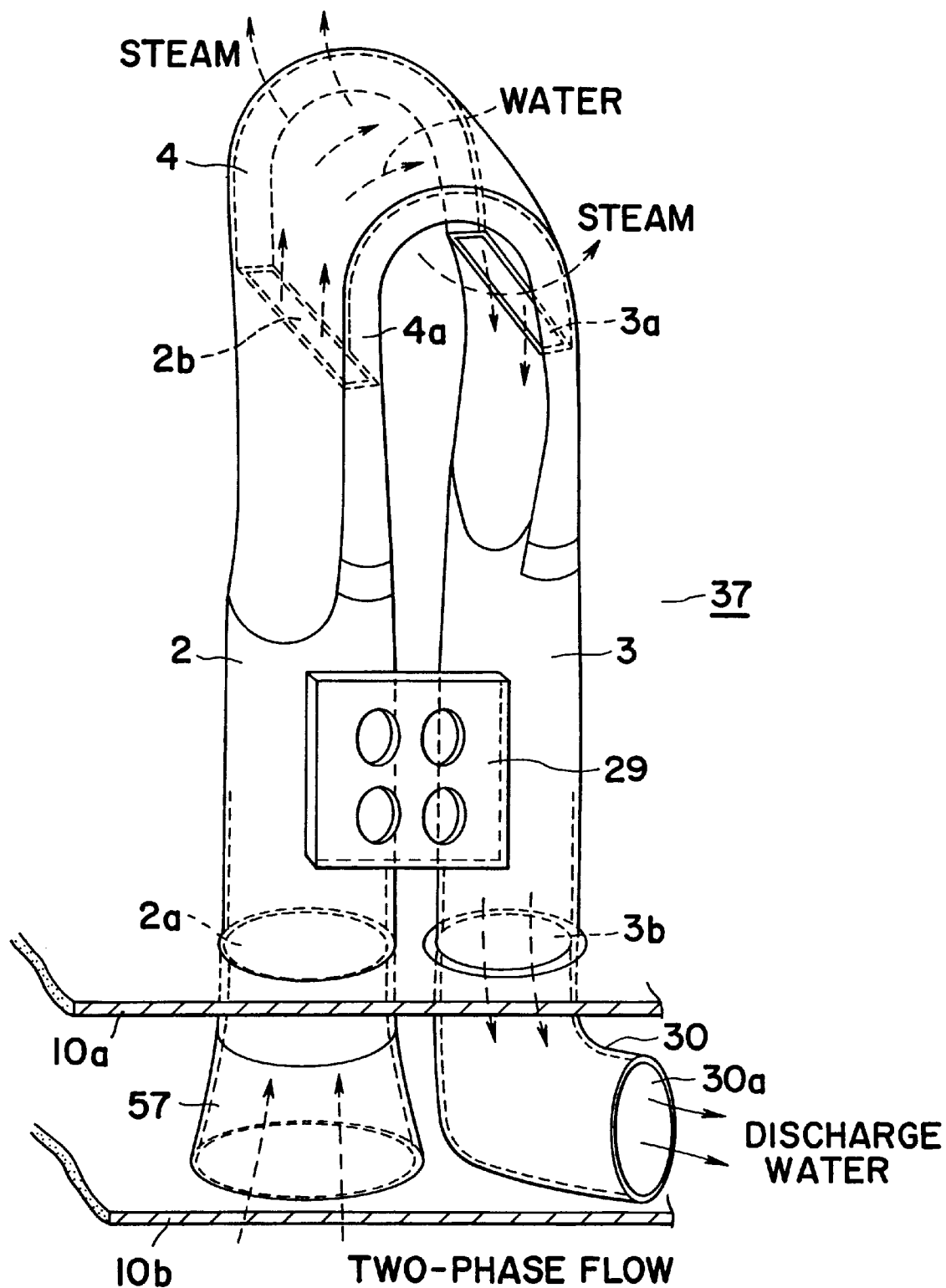
FIG. 5 is a perspective view illustrating a reinforcing plate and a discharge elbow in the steam separator of the first embodiment.

This embodiment could also be provided with a plate 29 for reinforcing the separator/injector 1 in the sideways direction, as well as a cylindrical discharge elbow 30 positioned between the double plates 10a and 10b, as shown in the perspective view of FIG. 5.

The separator/injector 37 shown in FIG. 5 has a structure in which loads imposed by fluid vibrations in the two-phase flow on the pipes of the two-phase flow accelerator nozzle 2 and the diffuser 3, as well as the liquid-phase capture means (the plate 4) that links them, are reduced by the provision of the reinforcing plate 29 across the two-phase flow accelerator nozzle 2 and the diffuser 3. The provision of the discharge elbow 30 smooths the flow of discharge water in the space between the double plates 10a and 10b, enabling a reduction in pressure losses in the discharge water.

An enlarged cross-sectional view through the wall surface that forms the liquid-phase capture means (the plate 4) of the separator/injector 1 of FIG. 1 is shown in FIG. 6(a). The side plates 4a in this case are indicated by a broken line. The section through the rectangular plate 4 shown here forms a smooth curve that is an inverted U-shape. However, the shape of the section through the rectangular plate 4 is not limited to an inverted U-shape; other shapes could be considered, such as a circular arc-shape 31, a rectangular shape 32, or an elliptical arc-shape 33, as shown in FIGS. 6(b), 6(c), and 6(d). Whichever shape is used, it is possible to capture the liquid phase of the two-phase flow that has been accelerated by the two-phase flow accelerator nozzle 2 and send it on to the diffuser 3. If at least part of the cross-sectional shape of the plate 4 is a circular or elliptical arc, as shown in FIGS. 6a, 6b, and 6d, the flowpath of the liquid phase of the two-phase flow, which extends over a certain angle, is not subjected to abrupt changes so there are no fluid losses and it is also possible to have a comparatively stable flow of the liquid phase in response to vibrations in the fluid in operation.

Second Embodiment

Figure 7:
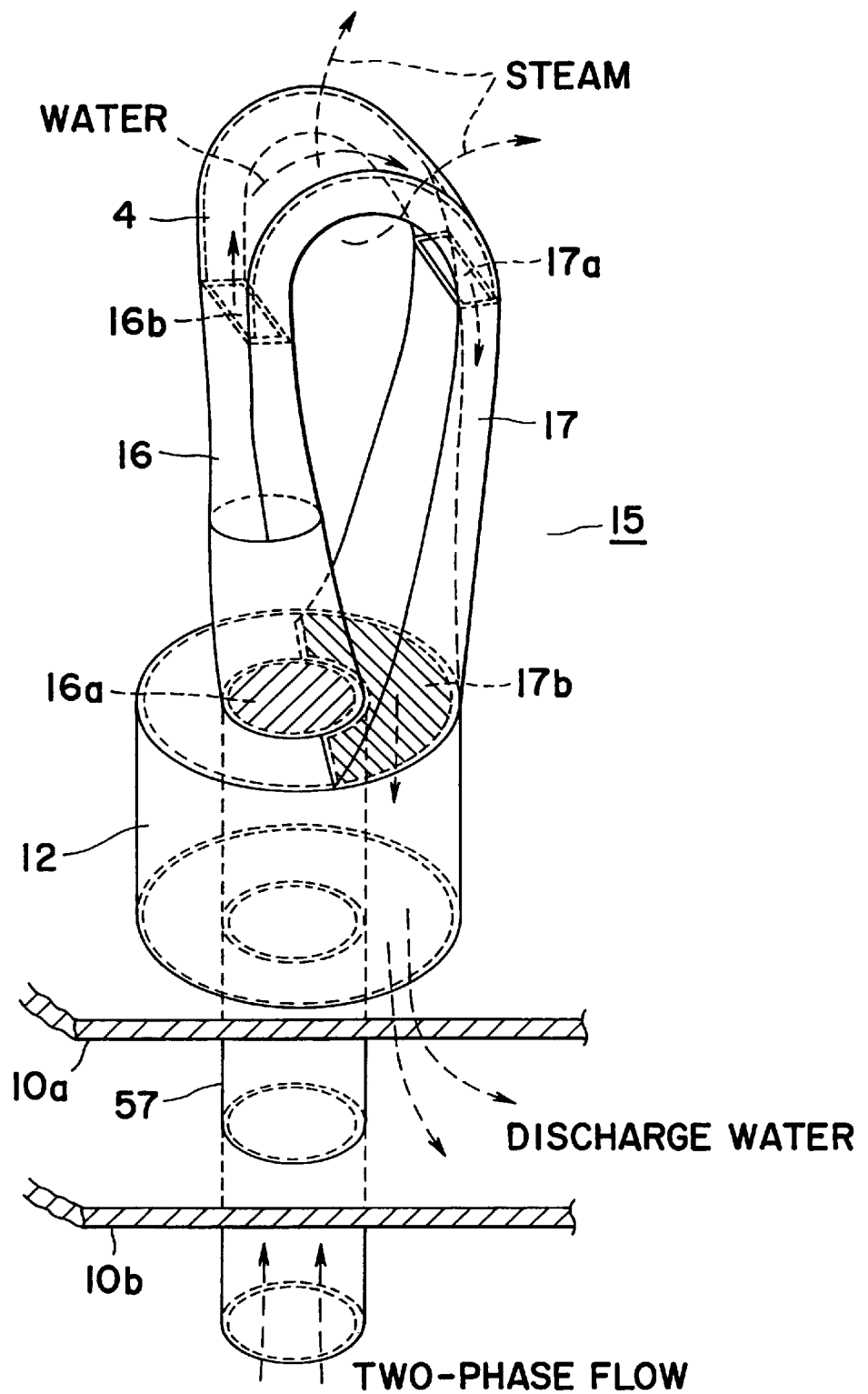
FIG. 7 is a perspective view of a steam separator in accordance with a second embodiment of the present invention.

A second embodiment of the present invention will now be described. The steam separator of this embodiment is a variation on the steam separator 1 of the above described first embodiment in which the separator/injector is provided with a circular cylindrical portion that forms a double-walled structure at a lower part thereof. A perspective view of this steam separator 15 is shown in FIG. 7.

A stand pipe 57 is disposed in such a manner that it penetrates the double plates 10a and 10b. A two-phase flow accelerator nozzle 16 that imparts an accelerating action to the two-phase flow is disposed directly above an upper aperture portion of this stand pipe 57, with the configuration being such that steam two-phase flow flowing therein from the upper aperture portion of the stand pipe 57 flows into this two-phase flow accelerator nozzle 16. An outer cylinder 12 is disposed between the two-phase flow accelerator nozzle 16 and the upper plate 10a so as to surround the stand pipe 57 and form a double-tube structure.

A two-phase flow introduction inlet 16a (shown hatched in the figure) of the two-phase flow accelerator nozzle 16 is connected to an opening at the upper end of the stand pipe 57, and vapor and liquid rising within the stand pipe 57 flows into the two-phase flow accelerator nozzle 16 through the two-phase flow introduction inlet 16a.

A linkage portion 17b opens into and connects a space portion between the stand pipe 57 and the outer cylinder 12 and a lower end of a diffuser 17. A tip end of the stand pipe 57 is completely sealed at portions other than portions 16a and 17b.

A lower end of the outer cylinder 12 opens into the upper plate 10a, and a space portion formed on the outer side of the stand pipe 57 and the inner side of the outer cylinder 12 is connected to a space portion formed by the double plates 10a and 10b.

With this configuration, there is no direct connection between the internal space of the stand pipe 57 (through which the two-phase flow rises and flows into the two-phase flow accelerator nozzle 16) and the space portion formed on the outer side of the stand pipe 57 and the inner side of the outer cylinder 12 (through which the discharge water flows downward from the diffuser 17 after the liquid-vapor separation). This is designed to ensure that the vapor and liquid of the two-phase flow is separated reliably by the steam separator 15, in a similar manner to that shown in FIG. 1.

In comparison with the steam separator 1 of FIG. 1, the steam separator of this embodiment requires a small increase in physical components during construction, necessitated by the provision of the double-walled structure, but it makes it possible to obtain substantially the same operational effects concerning liquid-vapor separation and discharge pressure as the embodiment of FIG. 1.

Third Embodiment

Figure 8:
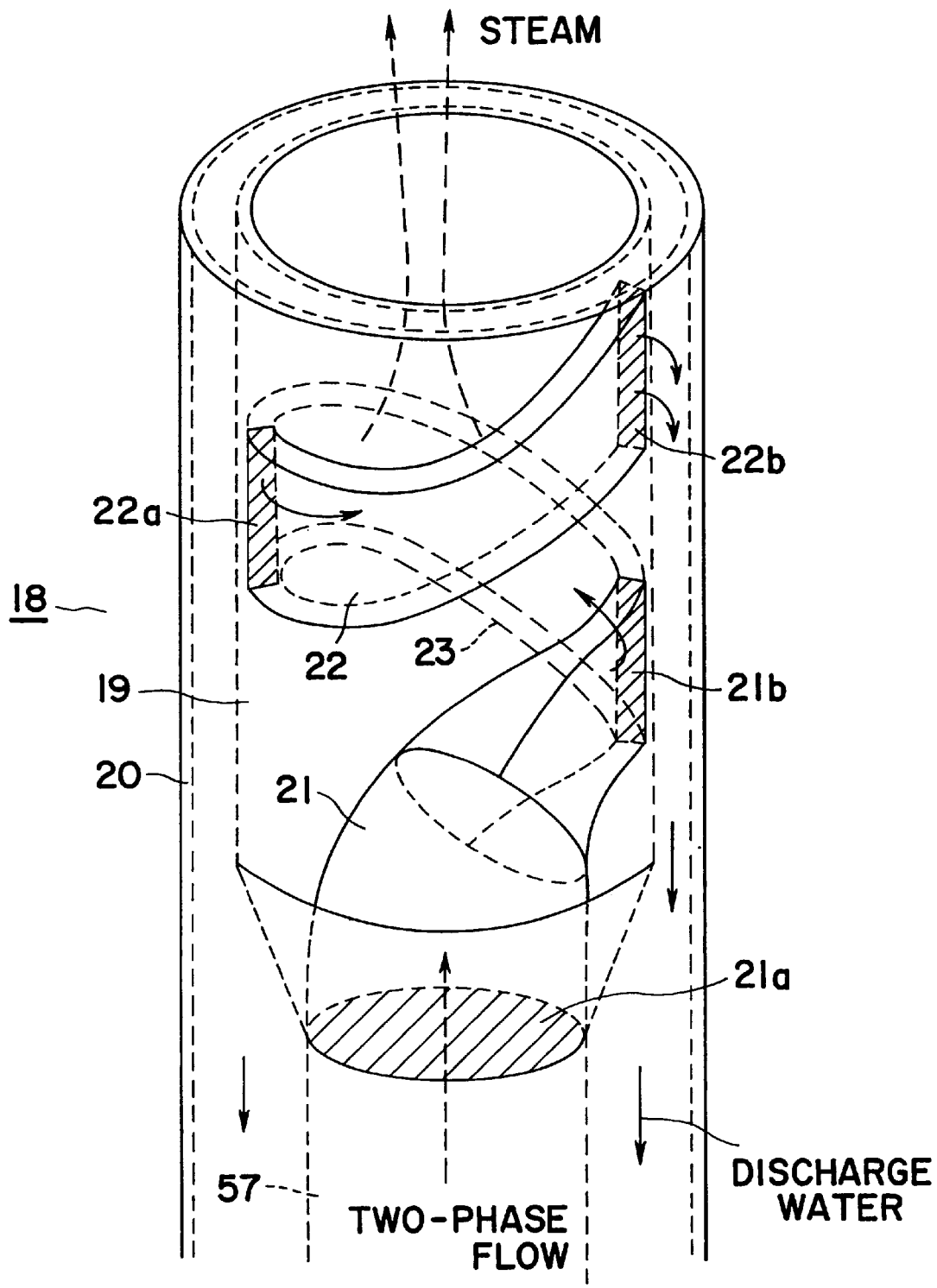
FIG. 8 is a perspective view of a steam separator in accordance with a third embodiment of the present invention.

The description now turns to a third embodiment of the present invention. A perspective view of a steam separator of this embodiment is shown in FIG. 8. Note that structural components that are similar to those of the first embodiment are given the same reference numbers and further description thereof is omitted.

This steam separator is configured of a separator/injector 18 having concentric circular cylinders 19 and 20, a two-phase flow accelerator nozzle 21, and a diffuser 22. The flowpath of the two-phase flow is provided in a helical form within the circular cylinders.

In other words, an inner cylinder 19 is provided directly above a stand pipe 57, and an outer cylinder 20 is provided around the outer side thereof. The two-phase flow accelerator nozzle 21 that imparts an accelerating action on the two-phase flow is disposed directly above an introduction inlet 21a at an upper end of the stand pipe 57, with the configuration being such that the two-phase flow flowing therein from the upper aperture portion of the stand pipe 57 flows into this two-phase flow accelerator nozzle 21. An upper portion of this two-phase flow accelerator nozzle 21 narrows and is formed into a helical shape, and a discharge outlet 21b at the upper end of the two-phase flow accelerator nozzle 21 is provided in the vicinity of an inner wall of the inner cylinder 19. Note that the internal structure of the inner cylinder 19 and the outer cylinder 20 is shown as a perspective view in this figure, and the introduction inlet 21a and the discharge outlet 21b of the two-phase flow accelerator nozzle 21 as well as an introduction inlet 22a and the discharge outlet 22b of the diffuser 22 are shown hatched.

The diffuser 22 is provided above the two-phase flow accelerator nozzle 21 and has a helical form in contact with the inner wall of the inner cylinder 19. The introduction inlet 22a at the lower end of the diffuser 22 is in the vicinity of the inner wall of the inner cylinder 19 and is an extension of a portion (indicated by the broken lines 23 in the figure) that forms a flowpath for mainly the liquid phase of the two-phase flow that is ejected from the two-phase flow accelerator nozzle 21, to form a structure that captures most of the liquid phase flowing along this duct 23. In other words, the inner wall of the inner cylinder 19 that forms this helical duct 23 is equivalent to the liquid-phase capture means configured by the plate 4 in the above described first embodiment.

The discharge outlet 22b at the upper end of the diffuser 22 is in contact with the inner cylinder 19 and opens into the inner cylinder 19. In other words, the discharge outlet 22b of the diffuser 22 is connected to the space formed between the inner cylinder 19 and the outer cylinder 20, and the water in the diffuser 22 is discharged through the discharge outlet 22b into this space between the double cylinders 19 and 20.

The description now turns to the operation of this separator/injector 18 having a helical duct. The two-phase flow of coolant that flows in from the stand pipe 57 enters the two-phase flow accelerator nozzle 21 above the stand pipe 57 and is accelerated to several tens of m/s. The two-phase flow ejected from the two-phase flow accelerator nozzle 21 is subjected to an accelerating action and flows from the outlet of the two-phase flow accelerator nozzle 21 to flow in the vicinity of the inner wall surface of the inner cylinder 19. The helical configuration of this two-phase flow accelerator nozzle 21 ensures that the two-phase flow is subjected to a strong centrifugal force within the duct so that it becomes a rotating flow.

During this time, the high-density water component of the two-phase flow is pressed against the inner wall surface along the duct in the vicinity of the inner wall of the inner cylinder 19, to form a liquid layer which has a free liquid surface and which flows at substantially constant velocity within the duct indicated by the broken lines 23 in the figure. It then flows into the introduction inlet 22a of the diffuser 22. The water that is decelerated and has had its pressure increased by the diffuser 22 is discharged from the discharge outlet 22b of the diffuser 22 downward through a space formed between the outer cylinder 20 and the stand pipe 57.

As previously described with reference to the first embodiment of this invention, the outlet pressure of the diffuser 22 can be increased to more than the inlet pressure of the helical-shaped separator/injector 18. Thus this embodiment can achieve similar liquid-vapor separation effects as the separator/injector 1 shown in FIG. 1.

Fourth Embodiment

Figure 28:
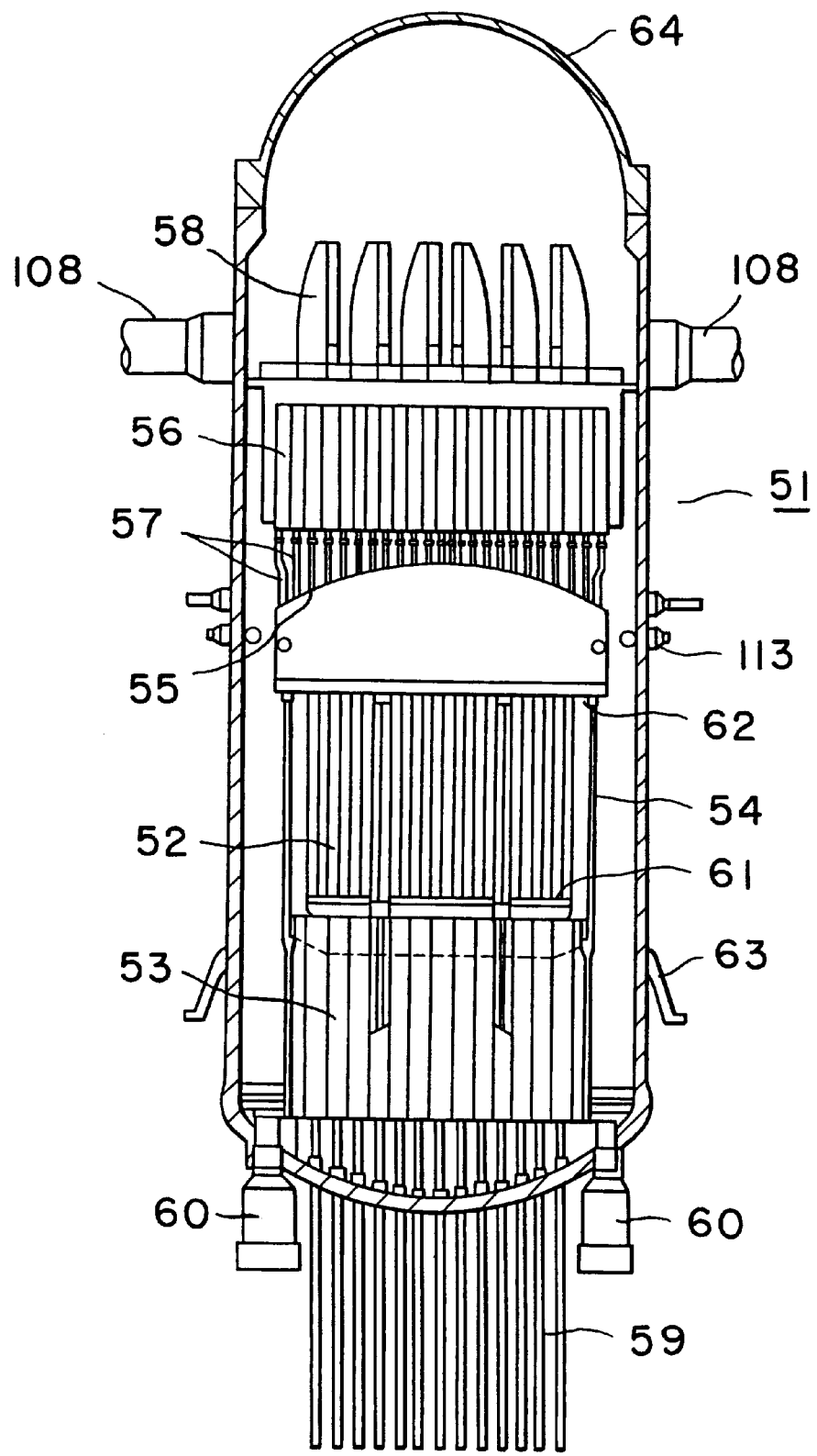
FIG. 28 is a cross-sectional view illustrating the concept of the systems of a conventional ABWR.
Figure 29:
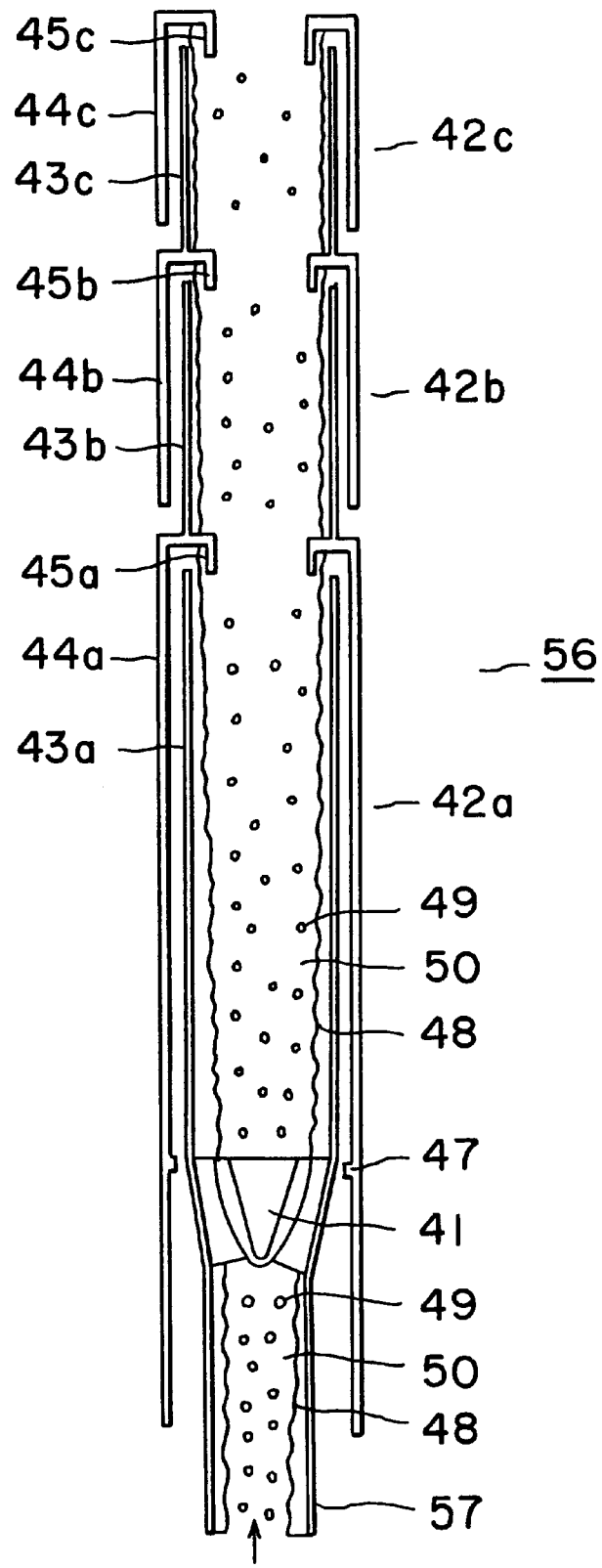
FIG. 29 is a cross-sectional view through essential components disposed in a conventional reactor pressure vessel.

A fourth embodiment of the present invention will now be described. The nuclear power generation plant to which this embodiment relates is a boiling-water reactor, the separator/injector 1 shown in FIG. 1 is installed therein as a steam separator, and a number of modifications are made to the nuclear power generation plant in accordance therewith. The essential components of the nuclear power generation plant of this embodiment are shown schematically in FIG. 9. Note that the control rod guidance tubes 53, control rod drive mechanism 59, upper lattice plate 62, and support skirt 63 shown in FIG. 28 have been omitted from FIG. 9, to simplify the drawing.

A shroud head positioned above the core has a double-walled structure, a plurality of stand pipes 57 are erected in these double shroud heads 10a and 10b, and the previously described separator/injector 1 is disposed thereabove. A lower opening portion of the diffuser 3 of the separator, injector opens into a space formed between the double shroud heads 10a and 10b.

In other words, the two-phase flow of coolant rising from below the lower shroud head 10b flows into each two-phase flow accelerator nozzle 2 through the corresponding stand pipe 57. The accelerated two-phase flow becomes a rotating flow and passes in the vicinity of the wall surface of the plate 4, which acts as a liquid-phase capture means, then the separated liquid-phase coolant flows into the diffuser 3. The discharge water from the diffuser 3 flows out into the space between the double shroud heads 10a and 10b.

The space portion between the double shroud heads 10a and 10b is linked by a jet-pump drive nozzle 13 to the interior of a jet pump 14 that is disposed below a downcomer portion 6, so that the discharge water from the separator/injector 1 is introduced into the jet pump 14.

A recirculation flow-rate control valve 7 is disposed in either the inlet or outlet of the jet pump 14. The recirculation flow-rate control valve 7 is connected to an actuator 8 that is driven by either electricity or gas. The actuator 8 is further connected to a recirculation flow-rate control means 9a, and the degree of opening of the recirculation flow-rate control valve 7 is adjusted as appropriate in accordance with the input of a valve-opening control signal from the recirculation flow-rate control means 9a.

An electrical output signal 11a from a turbine generator 130 connected to a turbine 107, a main steam flow-rate signal 11b from a main steam flow meter 131 provided in a main steam pipeline 108, a neutron flux output signal 11c from a neutron detector 132 provided in the core 52, and a jet-pump pressure difference signal 11d from a jet-pump pressure difference meter 133 (which detects the pressures at the inlet and outlet sides of the jet pump 14 and determines the difference therebetween) are input to the recirculation flow-rate control means 9a. When the recirculation flow-rate control means 9a receives these electrical signals 11a, 11b, 11c, and 11d, it calculates a suitable flow rate, sends a valve-opening signal 11e to the actuator 8 that is suitable for regulating the flow-rate, and thus adjusts the degree of opening of the recirculation flow-rate control valve 7 to control the recirculation flow-rate.

In other words, the calculations and control performed by the recirculation flow-rate control means 9a ensure that the recirculation flow-rate is adjusted on the basis of a difference between a predetermined electrical output calculated from the electrical output signal 11a and the current electrical output. In addition, the core flow-rate obtained by calculations from the jet-pump pressure difference signal 11d is controlled while variations in the main steam flow-rate are monitored by the main steam flow-rate signal 11b. The neutron flux output signal 11c is used to reduce the degree of opening of the recirculation flow-rate control valve 7 when a predetermined setting is exceeded, thus tripping the flow-rate.

An annular steam dryer 24 is provided above the separator/injector 1. An annular dryer disclosed in Japanese Patent Laid-Open Publication No. 232272/1993 is used as this steam dryer 24. This annular steam dryer 24 comprises dryer elements 24a formed of vertical perforated sheets disposed around the inner wall of a reactor pressure vessel 5, and a vessel 24b with a drain for discharging water and a drain pipe 24c are provided below the dryer elements 24a.

With this embodiment of the invention, the water that has been decelerated and has had its pressure increased by each diffuser 3, after being separated from the vapor phase by the plate 4 that is the liquid-phase capture means of the separator/injector 1, is removed through an aperture portion below the diffuser 3, flows out into the space between the double shroud heads 10a and 10b, and then proceeds towards the jet pump 14 from the jet-pump drive nozzle 13 disposed in the downcomer portion 6. The flow-rate of the recirculation discharge water obtained by this separator/injector 1 is adjusted as appropriate by the recirculation flow-rate control valve 7 that is disposed in the downcomer portion 6.

During this time, the outlet pressure of the diffuser 3 is higher than the inlet pressure of the separator/injector 1, so that the pressure of the coolant in the downcomer portion 6 and the core entrance is increased to enable forcible circulation within the core.

The low-density steam from the two-phase flow is separated and released into the open central portion formed by the wall surface of the plate 4 that acts as a liquid-phase capture means. It escapes from the underside of the flowpath in the vicinity of the wall surface of the plate 4 and rises, then flows into the steam dryer 24 positioned above the separator/injector 1.

The nuclear power generation system configured as described above makes it possible to control the recirculation flow-rate reliably and appropriately, while having substantially the same effects of the prior-art steam separator. It also makes it possible to use a simpler configuration, since the recirculation pumps of the prior-art nuclear power generation system can be omitted or at least reduced in number, concomitant with the increase in pressure of the discharge water.

Note that the separator/injector 37 of FIG. 5 could be used instead of the separator/injector 1 of this embodiment. In such a case, the flow of high-pressure discharge water in the space between the double shroud heads 10a and 10b can be smoothed and pressure losses can be reduced by setting each discharge elbow 30 of FIG. 5 in the direction of the downcomer portion 6.

Alternatively, the separator/injector 15 of FIG. 7 could be used instead of the separator/injector 1 of this embodiment. The essential components of the nuclear power generation plant consisting of a reactor in which the separator/injector 15 is mounted are shown schematically in FIG. 10. Similar effects to those obtained when the separator/injector 1 is used can be obtained in this case too.

Similarly, the separator/injector 18 having a helical duct as shown in FIG. 8 could also be used. In such a case, the configuration is such that the two-phase flow rising from below the lower shroud head 10a is introduced into each two-phase flow accelerator nozzle 21 through the corresponding stand pipe 57, and the discharge water from the diffuser 22 is discharged through the space formed between the outer cylinder 20 and the stand pipe 57 into the space between the double shroud heads 10a and 10b. Similar effects to those obtained when the separator/injector 1 is used can be obtained in this case too.

Fifth Embodiment

The description now turns to a fifth embodiment of the present invention. Note that structural components that are similar to those of the fourth embodiment are given the same reference numbers and further description thereof is omitted. The essential components of the nuclear power generation plant of this embodiment are shown schematically in FIGS. 11 and 12. The system shown in FIG. 11 uses the separator/injector 1 of FIG. 1 and the system shown in FIG. 12 uses the separator/injector 15 of FIG. 7.

Figure 9:
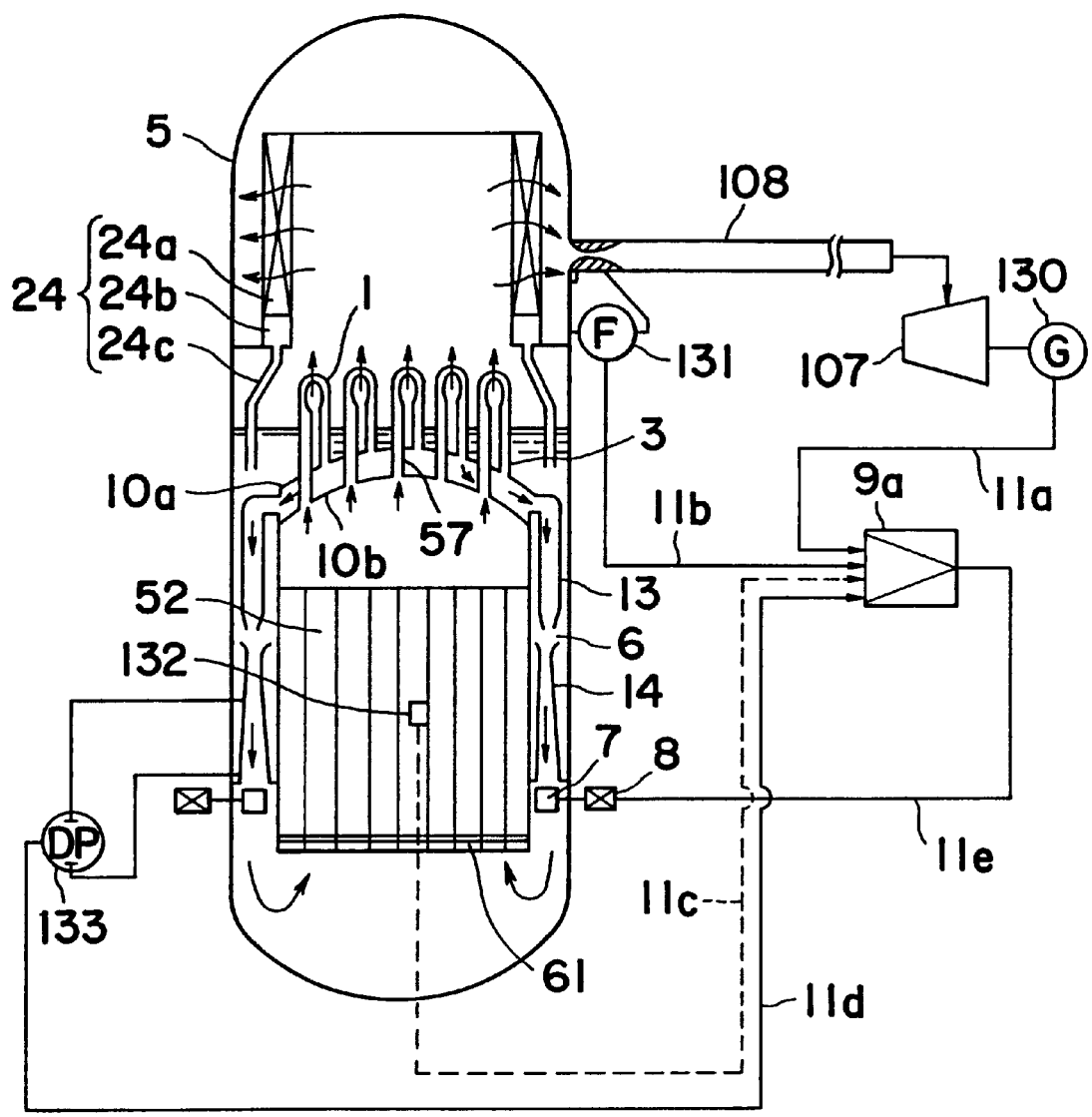
FIG. 9 is a schematic cross-sectional view of essential components of a nuclear power generation plant in accordance with a fourth embodiment of the present invention.
Figure 10:
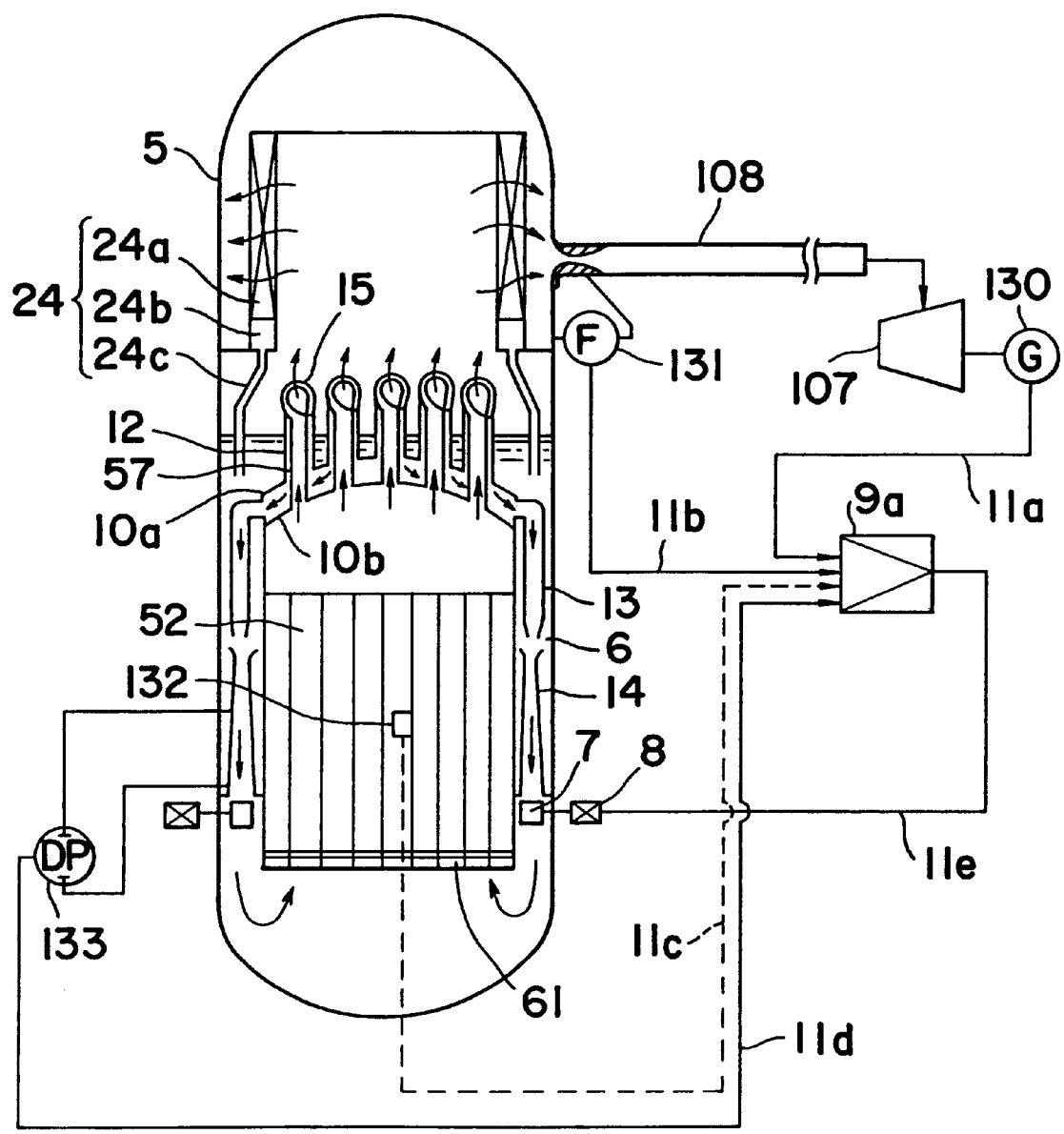
FIG. 10 is a schematic cross-sectional view of essential components of another nuclear power generation plant in accordance with this fourth embodiment.

This embodiment relates to an ABWR, with some modifications to the equipment disposed in the reactor pressure vessel 5 and the downcomer portion 6 and the equipment relating to the recirculation flow-rate control of the nuclear power generation plants shown in FIGS. 9 and 10. In other words, a downcomer pipe 25 is provided opening into the upper shroud head 10a, instead of the jet-pump drive nozzle 13 and jet pump 14 of FIG. 9, and an impeller 26 connected to an internal pump 27 is disposed at a lower portion of this downcomer pipe 25.

The internal pump 27 is connected to a variable-frequency power device 28 and the recirculation flow-rate can be guaranteed and controlled by controlling the rotational speed of the internal pump 27, or rather, the impeller 26, as appropriate in a manner that will be described later. This variable-frequency power device 28 is connected to a recirculation flow-rate control means 9b.

Figure 12:
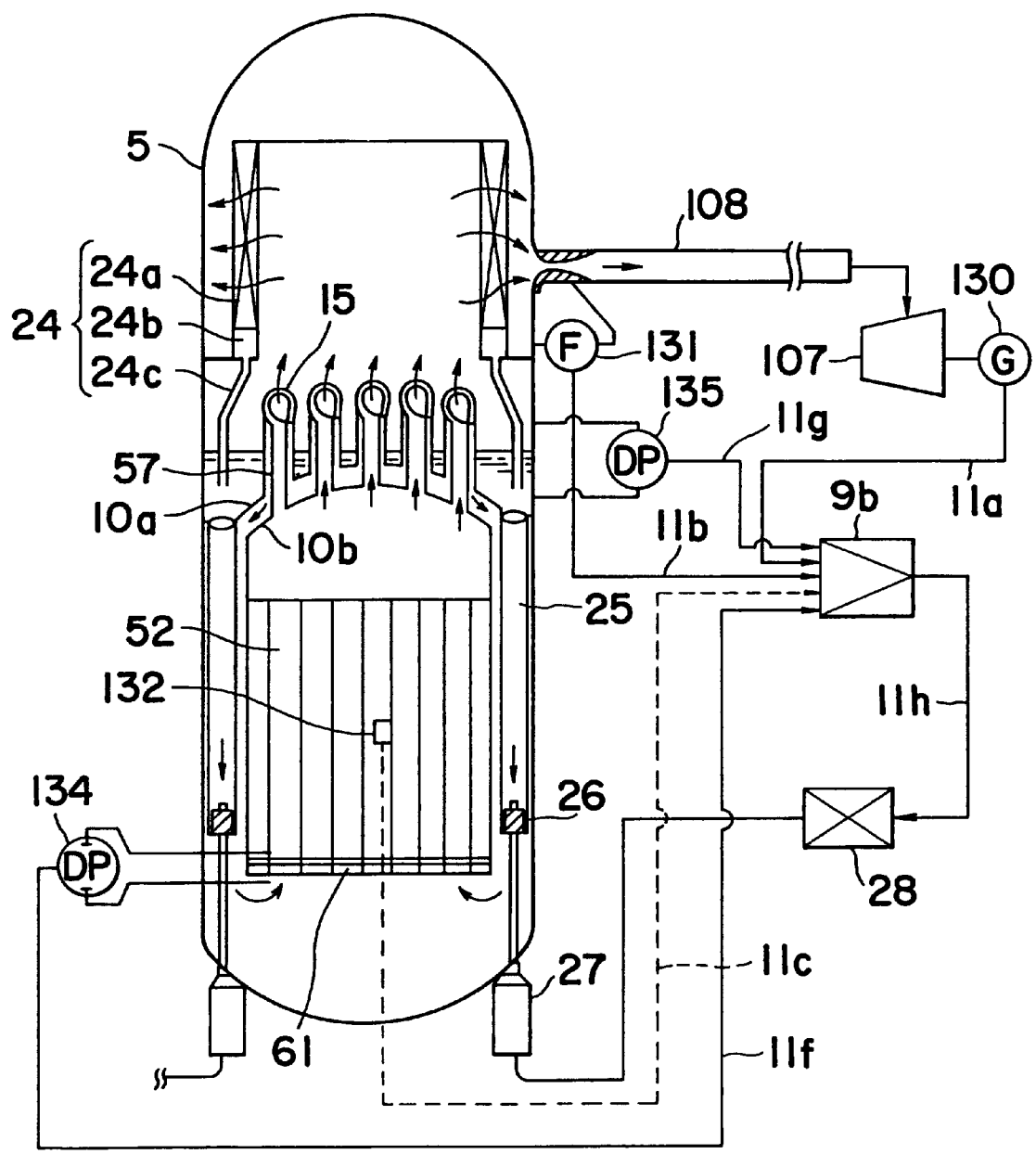
FIG. 12 is a schematic cross-sectional view of essential components of another nuclear power generation plant in accordance with this fifth embodiment.
Figure 13:
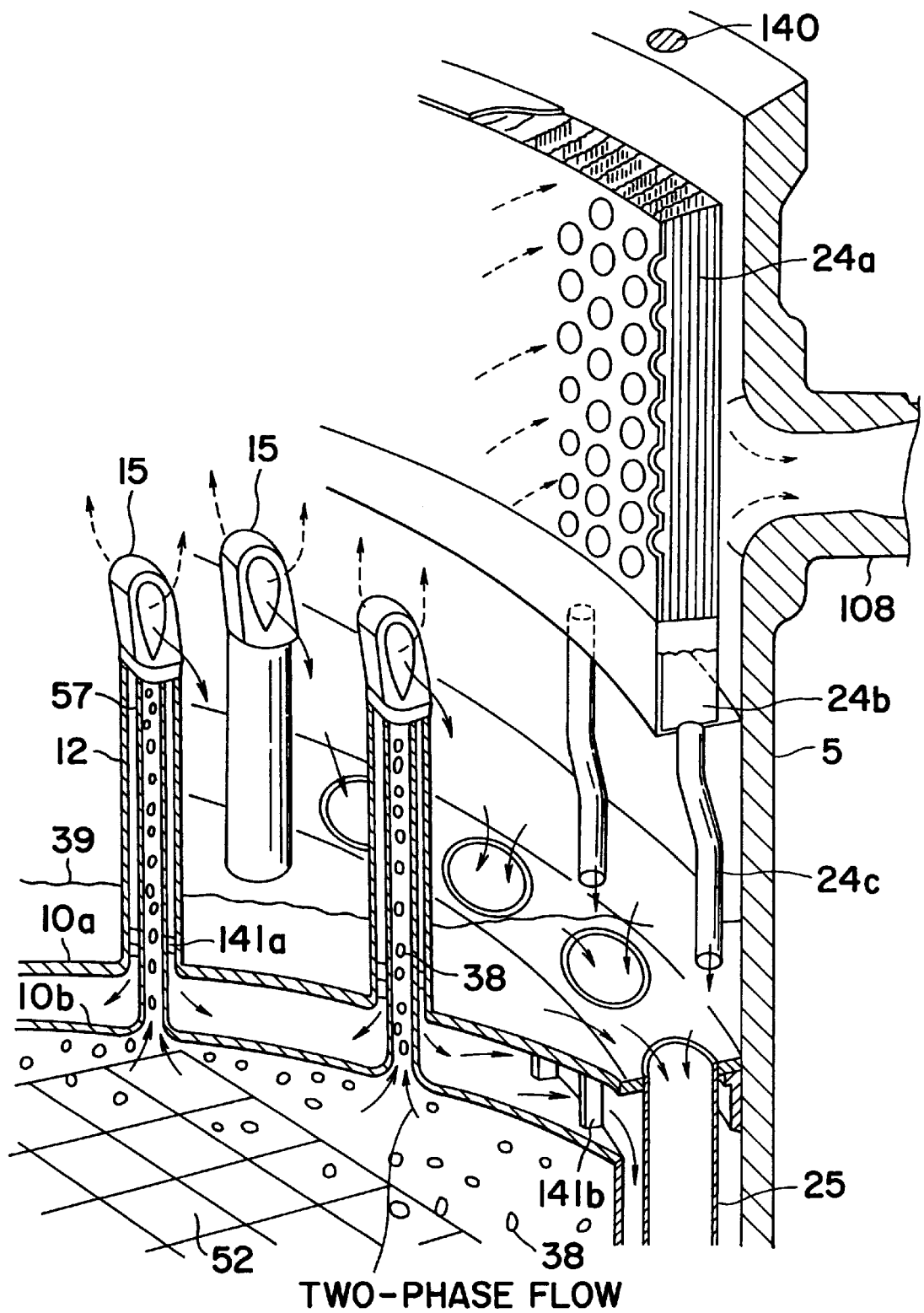
FIG. 13 is a partially cutaway bird's-eye view of an upper portion of the reactor pressure vessel of the nuclear power generation plant of the fifth embodiment.

A partially cutaway bird's-eye view of an upper portion of the reactor pressure vessel of the nuclear power generation plant of this embodiment is shown in FIG. 13. This figure corresponds to the system shown in FIG. 12, but the description below also relates to the system of FIG. 11. In this case, the peripheral equipment of the separator/injector 15 has been omitted from the figure, to concentrate on the path of the two-phase flow.

Reference number 140 in this figure denotes bolt holes of the reactor pressure vessel 5, reference number 141a denotes support members provided in the space between each stand pipe 57 and the corresponding outer cylinder 12, reference number 141b denotes guide plates provided between the double shroud heads 10a and 10b, reference number 38 denotes air bubbles in the two-phase flow, and reference number 39 denotes a water surface. The solid arrows in the figure indicate the two-phase flow into the separator/injector 15, the flow of discharge water from the separator/injector 15, and the flow of water that has overflowed from the liquid-phase capture means (the plate 4) or has been separated from the steam by the annular steam dryer 24. The broken arrows indicate the flow of steam from the two-phase flow.

Water overflowing from the separator/injector 15 or water from the annular steam dryer 24 reaches the impeller 26 through the downcomer pipe 25 provided connecting to the space above the upper shroud head 10a. This recirculates coolant into the core.

The discharge water from the separator/injector 15 moves into the downcomer portion 6 through the space between the double shroud heads 10a and 10b. As described previously, since this discharge water is raised sufficiently on the outlet side of the separator/injector 15, it has a recirculatory drive force that does not require the action of the internal pump 27.

An electrical output signal 11a from the turbine generator 130 connected to the turbine 107, a main steam flow-rate signal 11b from the main steam flow meter 131 provided in a main steam pipeline 108, a neutron flux output signal 11c from the neutron detector 132 provided in the core 52, a core support plate pressure difference signal 11f from a core support plate pressure difference meter 134 (which detects the pressures above and below the core support plate 61 and determines the difference therebetween), and a reactor water-level signal 11g from a reactor water-level meter 135 provided in the reactor pressure vessel 5 are input to the recirculation flow-rate control means 9b. When the recirculation flow-rate control means 9b receives these electrical signals 11a, 11b, 11c, 11f, and 11g, it calculates a suitable flow rate and sends a frequency signal 11h that is suitable for regulating the flow-rate to the variable-frequency power device 28, thus controlling the recirculation flow-rate by adjusting the rotational speed of the internal pump 27, or rather, the impeller 26.

In other words, the calculations and control performed by the recirculation flow-rate control means 9b ensure that the recirculation flow-rate is adjusted on the basis of a difference between a predetermined electrical output calculated from the electrical output signal 11a and the current electrical output. In addition, the core flow-rate obtained by calculations from the jet-pump pressure difference signal 11d is controlled while variations in the core support plate pressure difference are monitored by the core support plate pressure difference signal 11f. The neutron flux output signal 11c is used to reduce the degree of opening of the recirculation flow-rate control valve 7 when a predetermined setting is exceeded, thus tripping the flow-rate.

Similarly, the core water level is controlled as appropriate by constantly observing the difference between the core water level according to the reactor water-level signal 11g and a predetermined target water level. This method uses proportional integral differential (PID) control, which combines proportional, integral, and differential methods of control. Proportional control applies feedback that is proportional to the magnitude of an error. Integral control applies feedback corresponding to the integral of the error, taken at predetermined intervals of time, and differential control applies feedback corresponding to the magnitude of the differential of changes with time of the error. PID control is a total control method in which each of the above three types of feedback are given predetermined weightings. This makes it possible to control the core water level by adjusting the rotational speed of each internal pump as appropriate.

Use of the nuclear power generating plant of the above configuration makes it possible to separate the vapor and liquid more efficiently in the separator/injector, and also ensures that the recirculation flow-rate is guaranteed and also controlled appropriately. In addition, this embodiment makes it possible to reduce the rated capacity of each internal pump to approximately 10%, which in turn makes it possible to reduce the in-plant power equipment, leading to a simplification of the plant structure.

Sixth Embodiment

Figure 14:
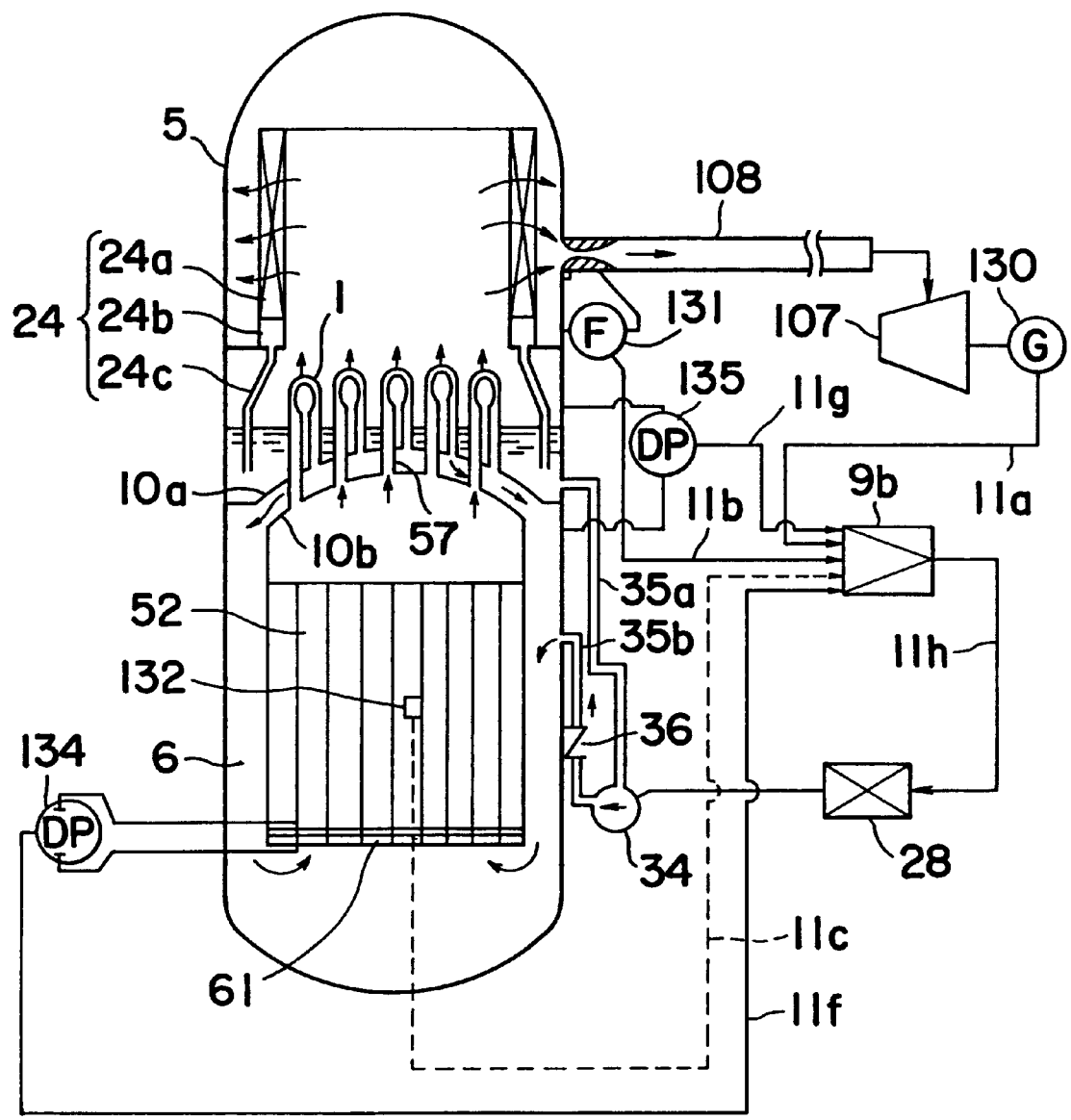
FIG. 14 is a schematic cross-sectional view of essential components of a nuclear power generation plant in accordance with a sixth embodiment of the present invention.

The description now turns to a sixth embodiment of the present invention. Note that structural components that are similar to those of the fifth embodiment are given the same reference numbers and further description thereof is omitted. The essential components of the nuclear power generation plant of this embodiment are shown schematically in FIGS. 14 and 15. The system shown in FIG. 14 uses the separator/injector 1 of FIG. 1 and the system shown in FIG. 15 uses the separator/injector 15 of FIG. 7.

Figure 11:
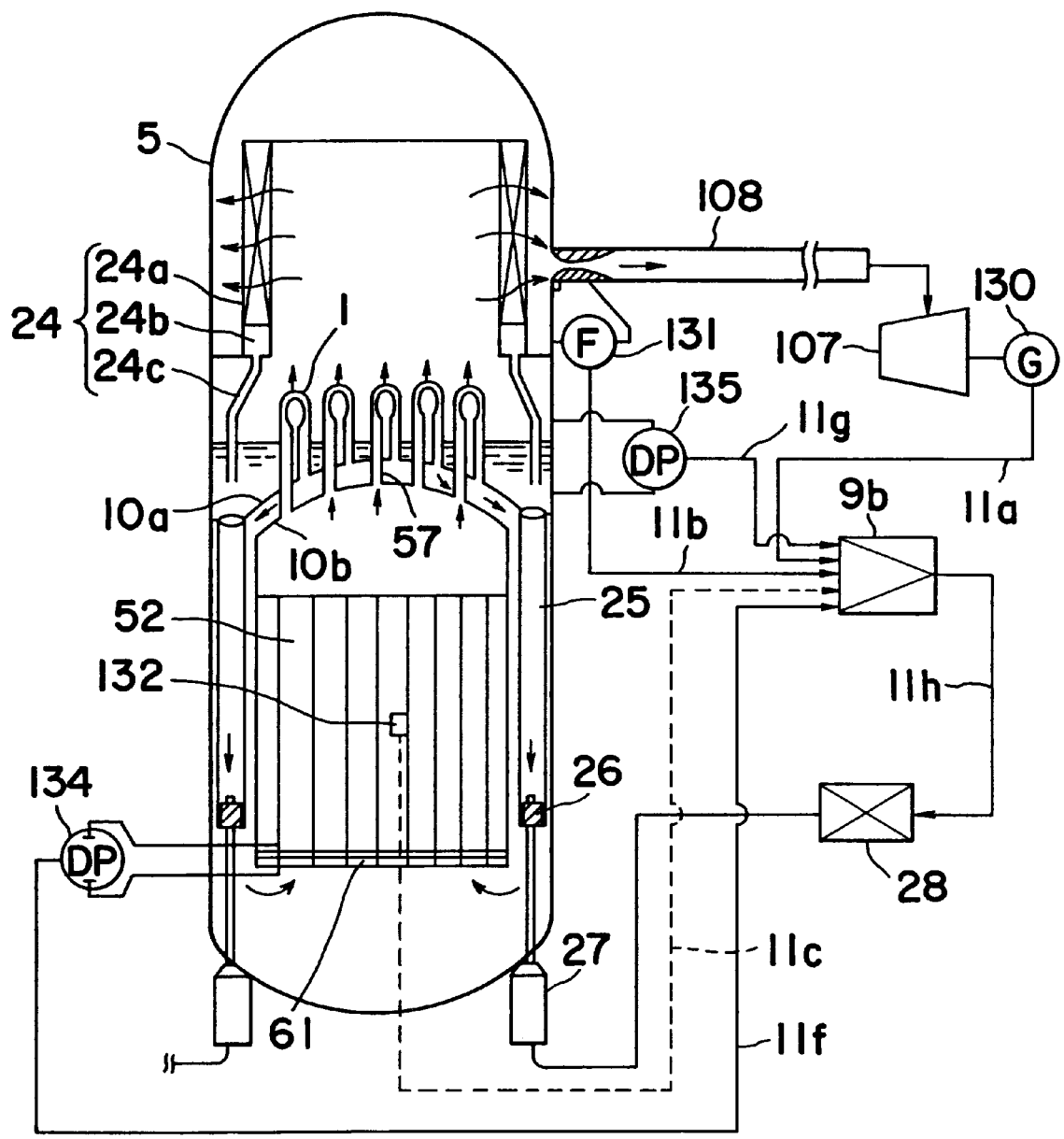
FIG. 11 is a schematic cross-sectional view of essential components of a nuclear power generation plant in accordance with a fifth embodiment of the present invention.

In this embodiment, the internal pump 27, impeller 26, and downcomer pipe 25 disposed in the reactor pressure vessel 5 of the nuclear power generation plant shown in FIG. 11 or 12 are removed. In their place, the reactor pressure vessel 5 is provided with a suction pipeline 35a that discharges out of the reactor pressure vessel 5 any overflowing water which has been recovered by the separator/injector 1 (or 15) positioned above the upper shroud head 10a, an overflow drain recovery pump 34 provided connected to the suction pipeline 35a to increase the pressure of overflow water removed by the suction pipeline 35a, and a discharge pipeline 35b connected to this overflow drain recovery pump 34 to return the increased-pressure overflow water to the downcomer portion 6 in the reactor pressure vessel 5. A non-return valve 36 is provided in this discharge pipeline 35b to prevent back-flow of the overflow water.

The overflow drain recovery pump 34 is disposed outside the reactor pressure vessel 5 and it is connected to the variable-frequency power device 28, to guarantee and also control the recirculation flow-rate by the same method as that of the above fifth embodiment.

The overflowing water is removed by the suction pipeline 35a to the overflow drain recovery pump 34 and the pressure thereof is increased by this pump 34. It is then combined with the liquid phase of the two-phase flow that has been discharged from the separator/injector 1 or 15 and introduced into the downcomer portion 6. Since the quantity of this overflow water is less than that of the water flowing into the downcomer portion 6 through the space between the double shroud heads 10a and 10b, the overflow drain recovery pump 34 itself can be made smaller than the jet pump of the prior-art BWR.

This configuration makes it possible to obtain substantially the same operational effects as the fifth embodiment. In addition, the use of a small pump 34 disposed outside the reactor pressure vessel, instead of an internal pump, helps to reduce and simplify the installation, particularly in a plant with a comparatively small output.

It is possible to consider using this overflow water recirculation system together with internal pumps. In such a case, the number of internal pumps can be reduced in comparison with those required for the fifth embodiment.

Seventh Embodiment

Figure 16:
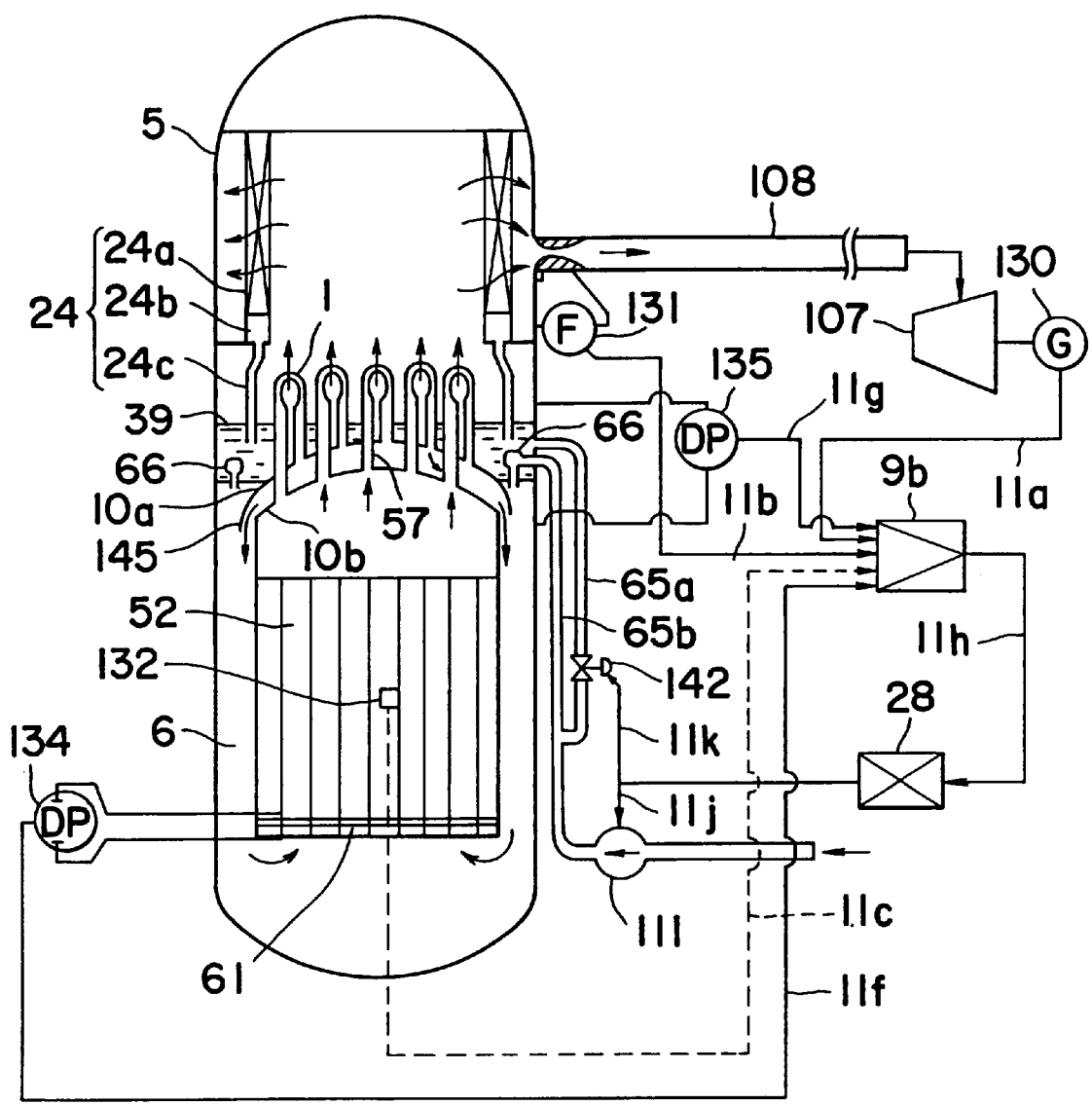
FIG. 16 is a schematic cross-sectional view of essential components of a nuclear power generation plant in accordance with a seventh embodiment of the present invention.

The description now turns to a seventh embodiment of the present invention. Note that structural components that are similar to those of the fifth embodiment are given the same reference numbers and further description thereof is omitted. The essential components of the nuclear power generation plant of this embodiment are shown schematically in FIG. 16.

This embodiment controls the reactor feedwater flow-rate in combination with the recirculation flow-rate by the recirculation flow-rate control means 9b of the fifth embodiment, shown in FIG. 11. It is characterized in that part of the feedwater system branches off into a water level regulation system and the water level in the reactor is controlled by supplying water to the reactor through a flow-rate adjustment valve.

A baffle plate 145 is provided connected to an outer peripheral edge of the upper shroud head 10a on the downcomer portion 6 side, directed towards the downcomer portion 6. This guides the discharge water from the separator/injector 1 reliably into the downcomer portion 6 through the double shroud heads 10a and 10b. In addition, a jet pump drive nozzle 66 is disposed on the side of this baffle plate 145 to supply water from the feedwater pump 111 towards the downcomer portion 6. Note that reference number 39 in this figure denotes the reactor water level.

This embodiment is also provided with a water level regulator pipe 65a having a water level control valve 142 and linking the feedwater pump 111 to the reactor pressure vessel 5, and a nozzle supply pipe 65b linking the feedwater pump 111 to the jet pump drive nozzle 66. The water level regulator pipe 65a and nozzle supply pipe 65b are both provided branching off from the feedwater system.

The recirculation flow-rate control means 9b calculates an appropriate flow-rate in accordance with the input of the electrical output signal 11a, the main steam flow-rate signal 11b, the neutron flux output signal 11c, the core support plate pressure difference signal 11f, and the reactor water-level signal 11g, then sends a frequency signal 11h that is suitable for regulating the flow-rate to the variable-frequency power device 28. This causes a feedwater flow-rate signal 11j to be sent from the variable-frequency power device 28 to the feedwater pump 111, thus controlling the feedwater flow-rate by controlling the rotational speed of the feedwater pump 111. A water level regulation system control signal 11k is also sent to the water level control valve 142 to adjust the degree of opening of the water level control valve 142 and thus control the flow-rate into the water level regulation system, that is, the reactor water level.

Figure 17:
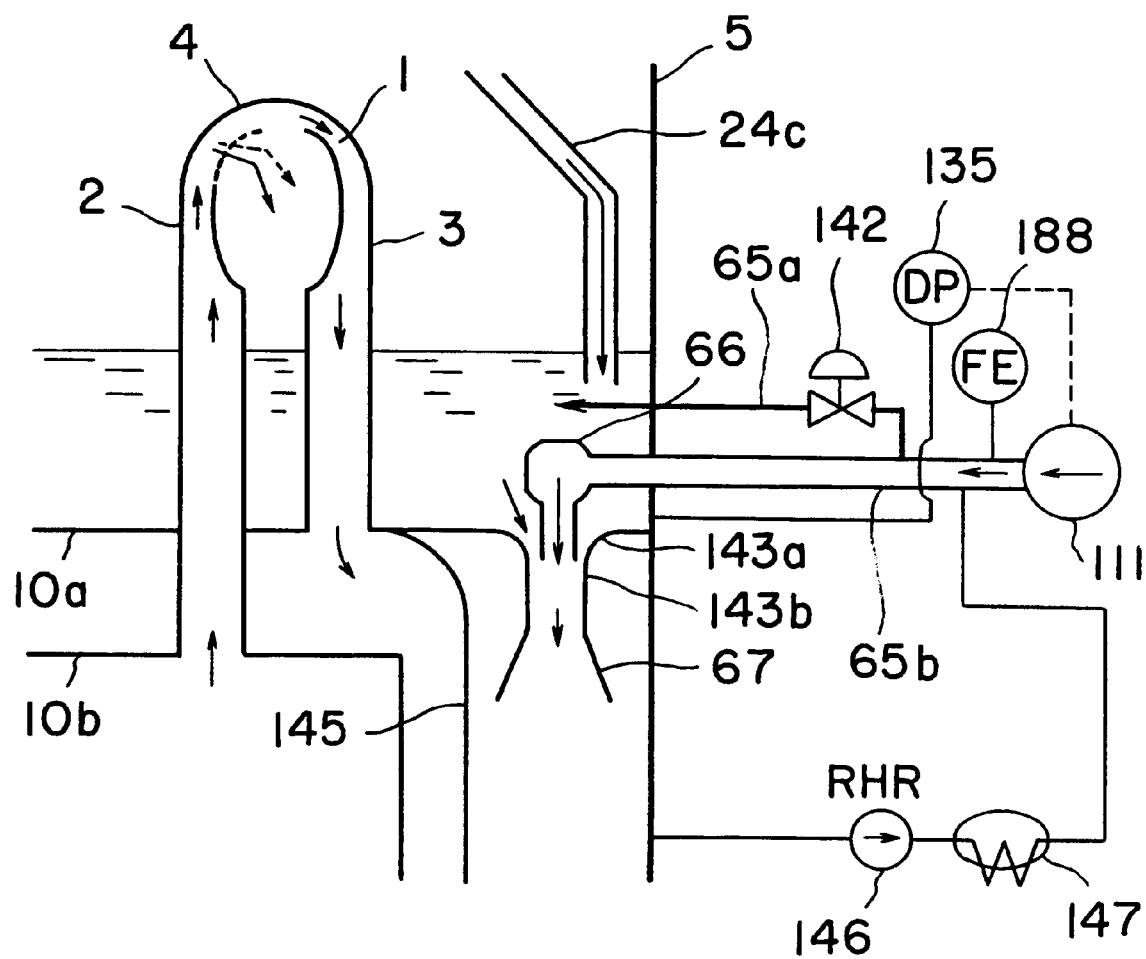
FIG. 17 is a schematic cross-sectional view of essential components of another nuclear power generation plant in accordance with this seventh embodiment.

An enlarged view of the environs of the jet pump drive nozzle 66 of the nuclear power generation plant of this embodiment is shown schematically in FIG. 17. A bell mouth 143a is disposed in an edge portion of the upper shroud head 10a that is one of the double shroud heads in such a manner that it is aligned with the position of the opening portion of the jet pump drive nozzle 66 and it opens towards the downcomer portion 6, and a straight pipe 143b is provided on a lower edge of this bell mouth 143a. A feedwater drive jet pump 67, consisting of a diffuser opening towards the downcomer portion 6, is disposed connected to this straight pipe 143b. In other words, the straight pipe 143b and the jet pump 67 are disposed on the downstream side of the jet pump drive nozzle 66. Note that reference number 188 in this figure denotes a feedwater flow-rate meter.

The fluid pressure within the downcomer portion 6, the lower plenum of the reactor, the core 52, the upper plenum of the reactor, the two-phase flow accelerator nozzle 2, and the diffuser 3 is increased in that sequence by increasing the flow-rate and discharge pressure of the water supplied from the feedwater pump 111 through the jet pump drive nozzle 66 to the jet pump 67. This causes the core recirculation flow-rate to increase, enabling control over the thermal output of the reactor.

When the nuclear power plant is started up, it is assumed that discharge water from pumps of other systems, such as a residual heat removal (RHR) system or a reactor water clean-up (CUW) system, is combined with the flow of the above feedwater system. FIG. 17 shows the case in which an RHR system pump 146 is linked to water supplied to the jet pump 67 from the feedwater pump 111, where discharge water from the RHR system pump 146 flows to the jet pump drive nozzle 66 only when the plant is started up. This configuration makes it possible to promote a natural recirculation force as drive water for the jet pump, thus making is possible to start up the nuclear power plant in a simple manner without using a large recirculation pump.

Eighth Embodiment

Figure 18:
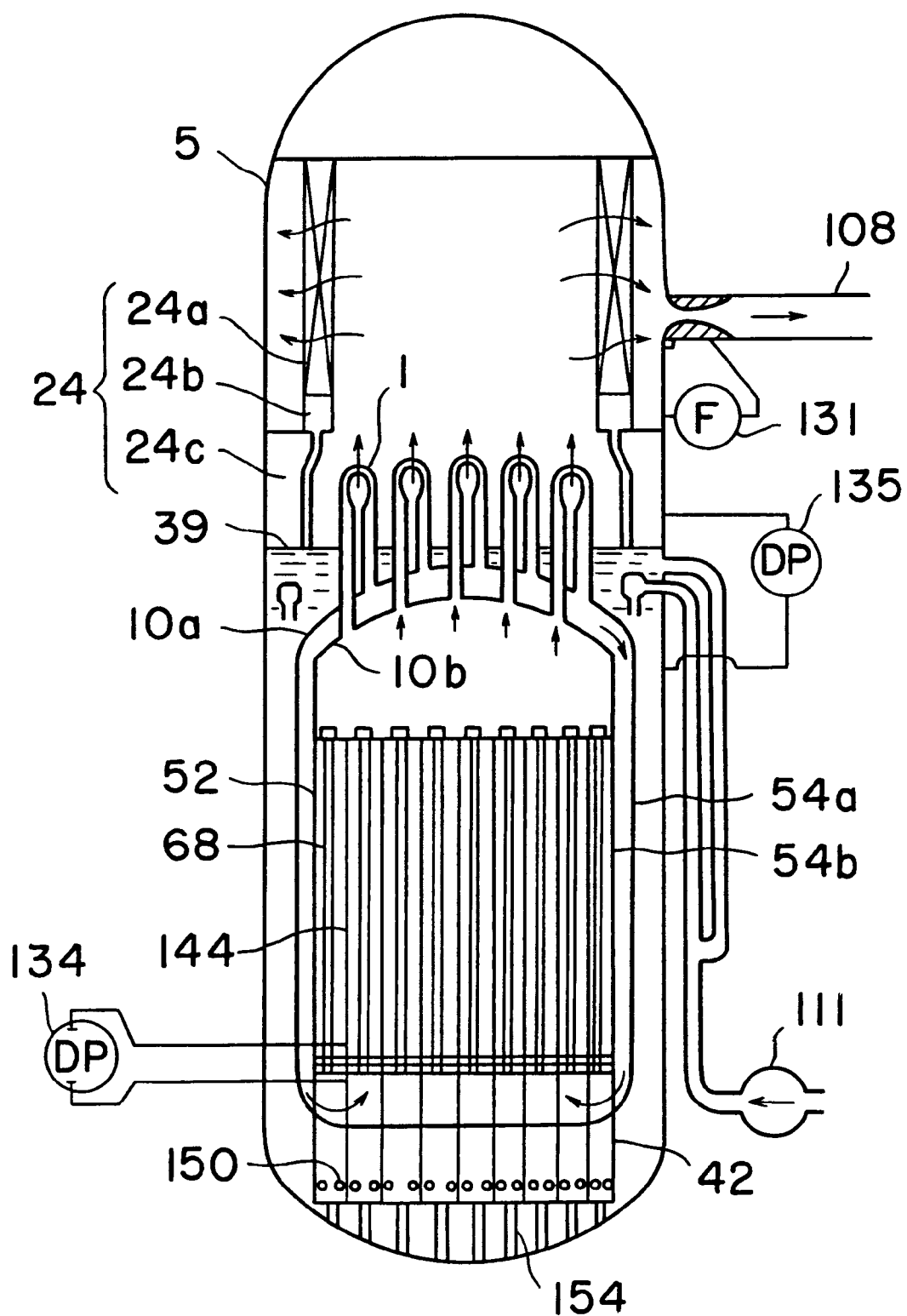
FIG. 18 is a schematic cross-sectional view of essential components of a nuclear power generation plant in accordance with an eighth embodiment of the present invention.
Figure 19:
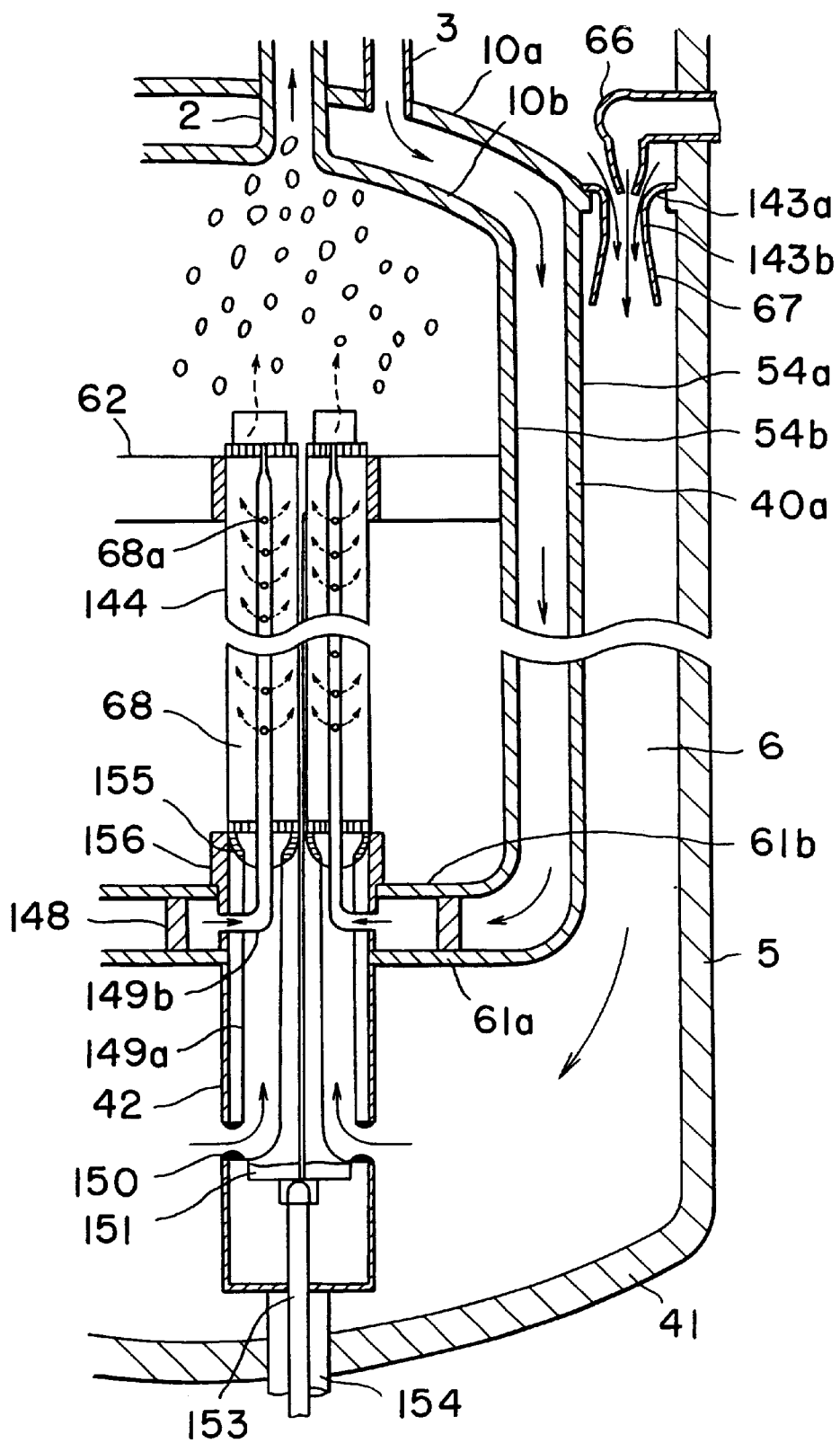
FIG. 19 is a schematic cross-sectional view of essential components of another nuclear power generation plant in accordance with this eighth embodiment.

The description now turns to an eighth embodiment of the present invention. Note that structural components that are similar to those of the seventh embodiment are given the same reference numbers and further description thereof is omitted. The essential components of the nuclear power generation plant of this embodiment are shown schematically in FIG. 18 and a partial enlarged cross-sectional view thereof is shown in FIG. 19. This embodiment is characterized in that the shroud casing and core support plate each have a double-walled structure, and the discharge water from the separator/injector 1 is introduced into water rods of the fuel rod assemblies through an introduction path.

In other words, a double shroud casing consisting of an outer shroud casing 54a and an inner shroud casing 54b is disposed around the sides of the shroud, and the space between the double shroud heads 10a and 10b is connected to the space between the double shroud casings 54a and 54b. Similarly, the core support plate in the lower plenum has a double-walled structure consisting of a lower core support plate 61a and an upper core support plate 61b, and the space formed between the core support plates 61a and 61b is connected to the space between the double shroud casings 54a and 54b. Note that a plurality of reinforcement ribs 148 are provided between the lower core support plate 61a and the upper core support plate 61*b*, to ensure the structural integrity of the core support. A water rod 68 having a plurality of holes 68*a* aligned along the longitudinal direction thereof, through which the coolant flows, is provided for each fuel rod assembly 144 that configures the core. Note that reference number 155 in FIG. 19 denotes a lower tie plate and reference number 156 denotes a fuel support bracket. A coolant guidance pipe 149*a* is provided within a control rod guidance tube 42, passing through the downcomer portion 6 and the lower tie plate 155 of the corresponding fuel rod assembly 144, to allow coolant to flow from the downcomer portion 6 to the core 52. Note that a coolant inlet of the coolant guidance pipe 149*a* is provided with an orifice 150 that constricts the coolant flowpath locally. The location of the orifice 150 is not limited thereto; it could equally well be provided in the fuel support bracket 156.

The surface of the orifice 150 is formed to be smoothly curved, which has the effect of reducing the pressure loss coefficient of the coolant flowing through the guidance pipe 149*a*. A reduction in the pressure loss coefficient leads to a reduction in the increase in pressure losses due to an increase in fluid flow-rate.

With this configuration, the recirculating flow driven by the jet pump drive nozzle 66 is introduced into the lower tie plate 155 through the coolant guidance pipe 149*a* having the orifice 150. The provision of the orifice 150 for reducing the pressure loss coefficient makes it possible to cause an increase in the core flow-rate when the core output increases, further increasing the thermal output, without leading to deterioration in pressure losses.

Another coolant guidance pipe 149*b* that passes through the space formed between the core support plates 61*a* and 61*b* is provided connected to the lower end of the water rod 68 having the holes 68*a*. This coolant guidance pipe 149*b* ensures that the high-pressure discharge water from the separator/injector 1 passes through each of the spaces formed between the double shroud heads 10*a* and 10*b*, the double shroud casings 54*a* and 54*b*, and the core support plates 61*a* and 61*b*, so that part thereof is sent into each fuel rod assembly 144 through the holes 68*a*.

This distribution of water into the fuel rod assemblies 144 through the holes 68*a* makes it possible to increase the liquid-film flow-rate of the two-phase flow of coolant, which in turn makes it possible to improve the maximum heat power of the core.

Figure 20:
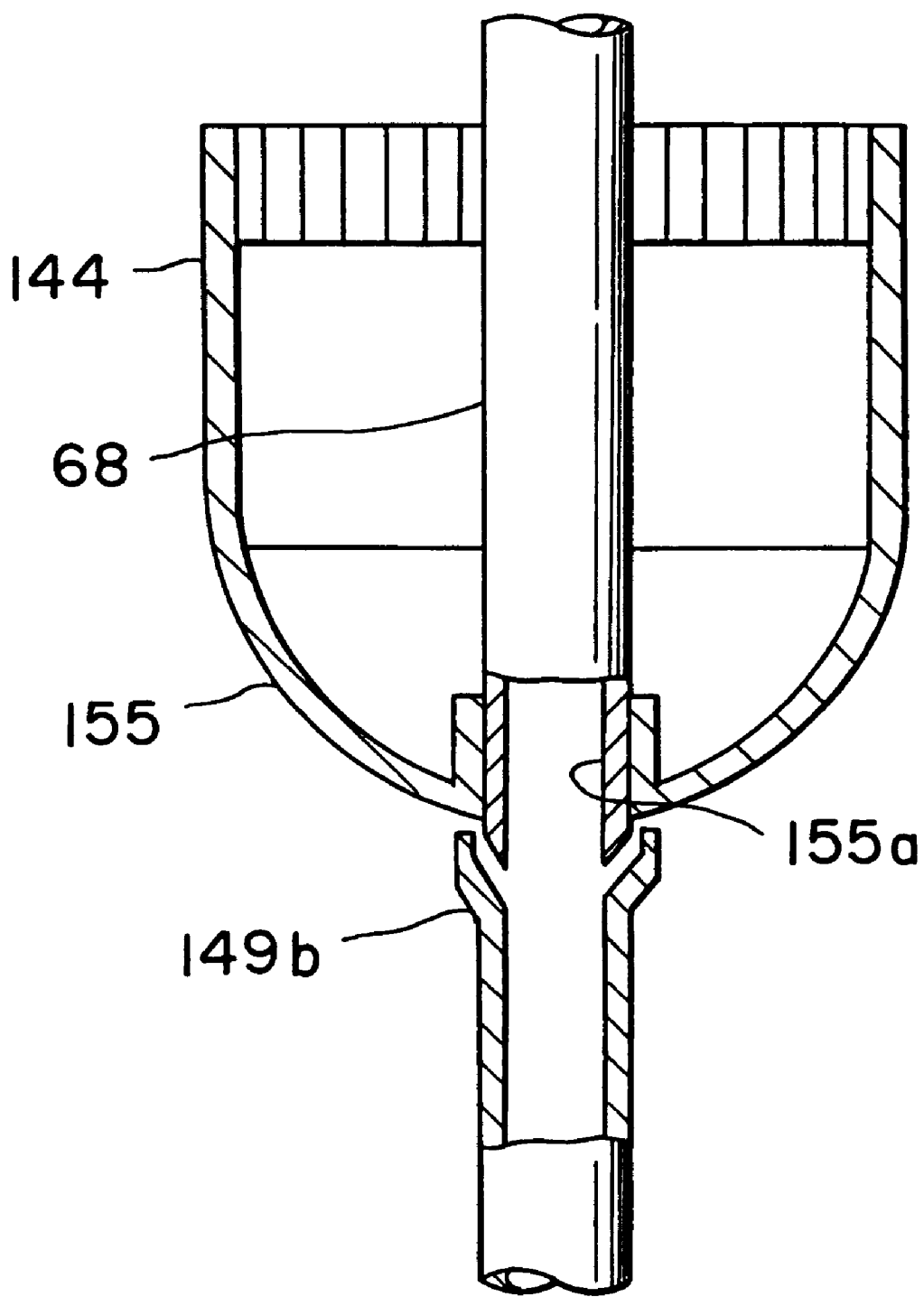
FIG. 20 is an enlarged cross-sectional view of a portion of a fuel rod assembly of the nuclear power generation plant of this eighth embodiment.

The structure of a connective portion between the coolant guidance pipe 149*b* and a lower end portion 155*a* of the water rod, which is positioned below the water rod 68 and is connected to the lower tie plate 155, will now be described with reference to FIG. 20. This figure is an enlarged cross-sectional view in the vicinity of the lower tie plate 155 of the fuel rod assembly 144.

The connective portion between these two components is constructed in such a manner that the coefficient of thermal expansion of the metal material of the coolant guidance pipe 149*b* is less than that of the metal material of the lower end portion 155*a* of the water rod, which is positioned within the coolant guidance pipe 149*b*. In other words, a slight space is created between the two components when the reactor is halted, so that a small quantity of coolant leaks downward from the coolant guidance pipe 149*b*. When the reactor is operating normally, the difference between the coefficients of thermal expansion ensures that the coolant guidance pipe 149*b* and lower end portion 155*a* of the water rod are in close contact, so that the amount of coolant leaking is greatly reduced. This makes it possible to improve the seal between the coolant guidance pipe and the water rod, in other words, the leakage reduction capability thereof.

Figure 21A:
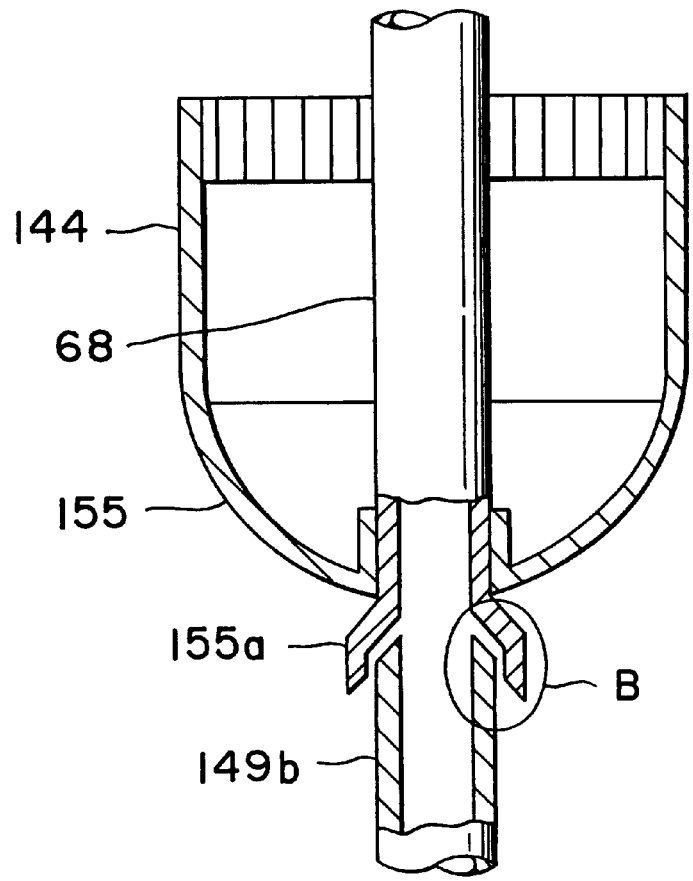
FIG. 21(a) is an enlarged cross-sectional view of a variation in the portion of the fuel rod assembly of the nuclear power generation plant of this eighth embodiment.
Figure 21B:
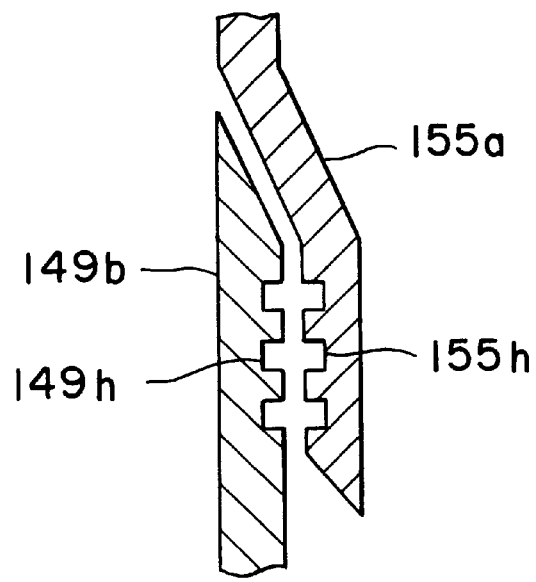
FIG. 21(b) is a further enlarged view of the portion B of FIG. 21(a)

Note that if the lower end portion 155*a* of the water rod is to be positioned on the outer side of the coolant guidance pipe 149*b*, as shown in FIG. 21*a*, the coefficient of thermal expansion of the metal material of the coolant guidance pipe 149*b* should be larger than that of the metal material of the lower end portion 155*a* of the water rod. Instead of the configuration shown in FIG. 20, the leakage reduction capability could be increased by increasing the resistance in the flowpath along which the coolant leaks. The structure of the connective portion between the lower end portion 155*a* of the water rod and the coolant guidance pipe 149*b* in such a case will now be described with reference to FIG. 21. FIG. 21(*a*) is an enlarged cross-sectional view of the vicinity of the lower tie plate 155 of the fuel rod assembly 144 and FIG. 21(*b*) is a further enlargement of the portion B in FIG. 21(*a*).

Labyrinth grooves are formed at substantially the same height in both the lower end portion 155*a* of the water rod and the coolant guidance pipe 149*b*. These narrow and widen the flowpath of the leaking coolant to a great degree at certain positions. Thus the coolant leakage reduction capability can be improved when the reactor is operating at high temperatures.

The positions of the holes 68*a* provided in the water rod 68 of this embodiment will now be described. It should be obvious to those in the art that the holes 68*a* could be disposed substantially equidistantly in the axial direction of the water rod 68, or the positions of the holes 68*a* could be disposed non-equidistantly.

Figure 22:
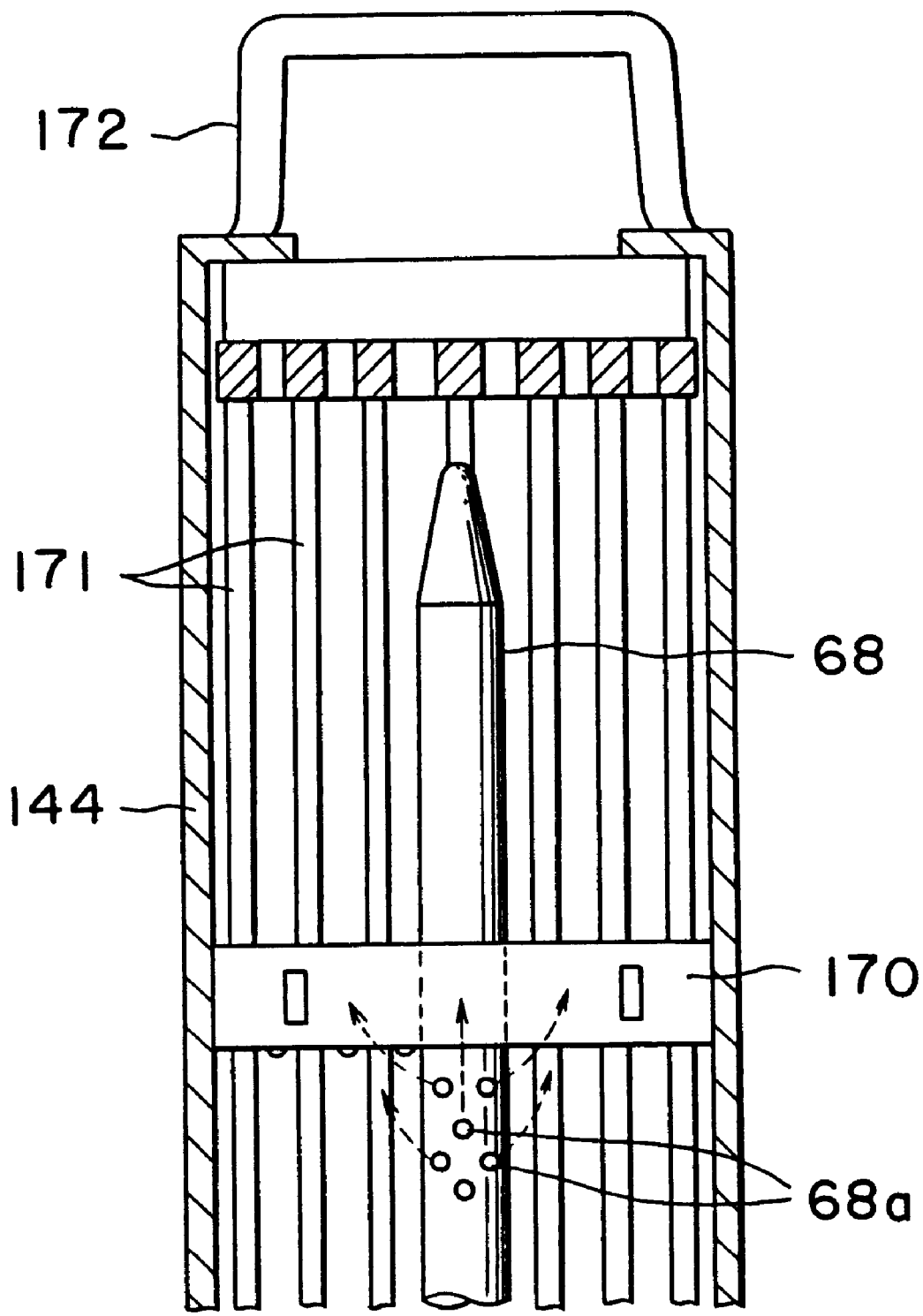
FIG. 22 is a cross-sectional view through another variation in the fuel rod assembly of the nuclear power generation plant of this eighth embodiment.

One non-equidistant disposition of the holes 68*a* that could be considered is a local cluster of many holes 68*a* disposed at a position in the vicinity of the uppermost spacer 170 of a plurality of spacers provided for the fuel rod assembly 144, for example. A cross-sectional view through the top of the fuel rod assembly in such a case is shown in FIG. 22. Reference number 171 in the figure denotes a fuel rod and reference number 172 denotes an upper tie plate. This configuration is based on the consideration that the coolant density around the fuel rod assembly 144 will decrease with height, making it easy boiling transition to occur, so that a supply of a large quantity of the high-pressure coolant ejected from the separator/injector 1 locally into the vicinity of the uppermost spacer enable an evening of the coolant density in the axial direction of the fuel rod assembly, which will in turn help make the output distribution more even. For the same reason, large numbers of holes 68*a* could be provided similarly in the vicinities of the spacers positioned second and third from the top.

Figure 23:
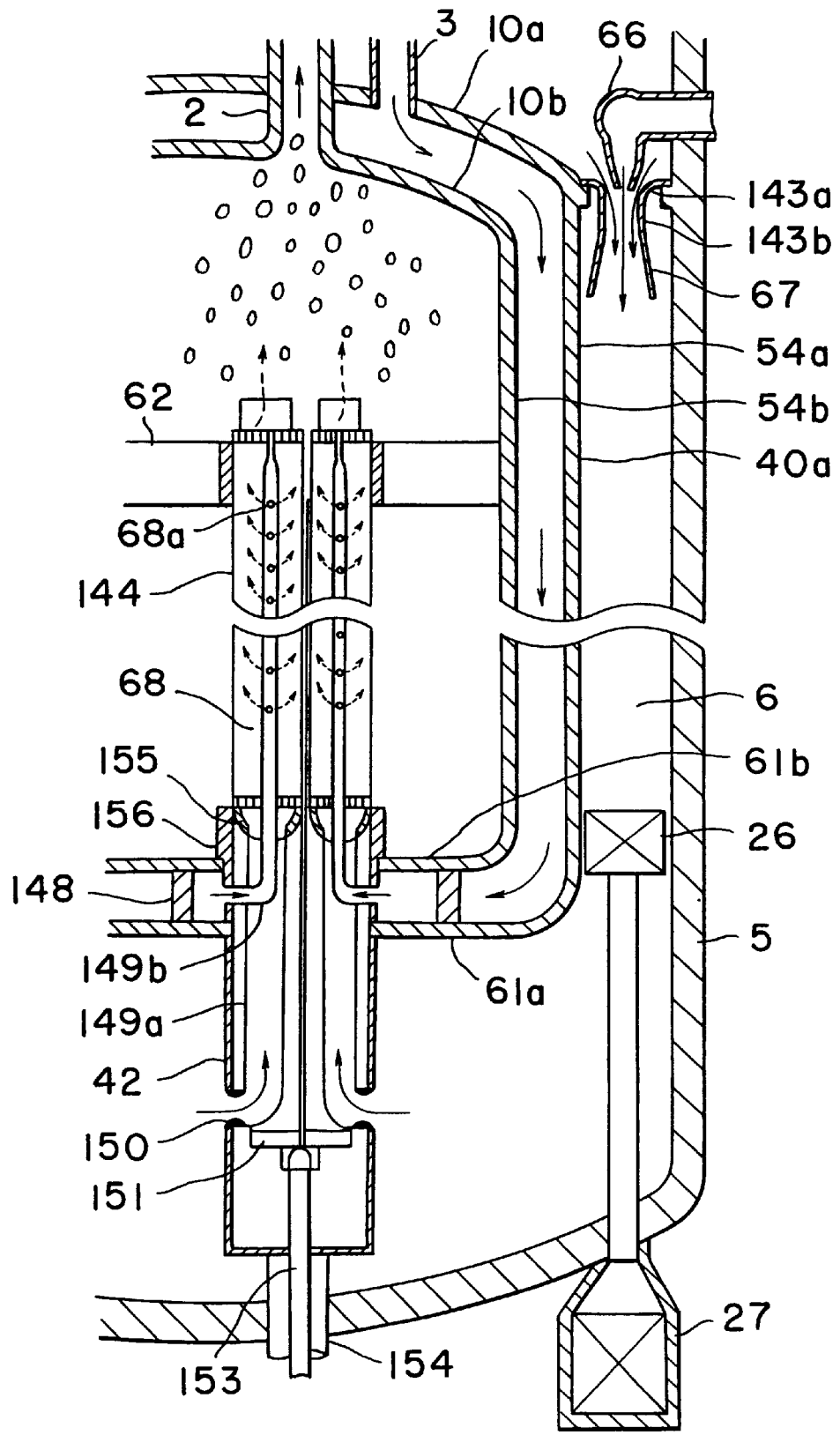
FIG. 23 is a schematic cross-sectional view through essential components of the nuclear power generation plant of a further variation of this eighth embodiment.

The description now turns to the application of this embodiment of the present invention to an ABWR. A cross-sectional view through essential components of the nuclear power generation plant in such a case is shown in FIG. 23. In this configuration, an impeller 26 connected to an internal pump 27 is disposed in the downcomer portion 6, instead of the feedwater drive jet pump 67 shown in FIG. 19, or in addition thereto. FIG. 23 shows the use of both the internal pump 27 and the jet pump 67.

In this case, the driving force of the internal pump 27 makes it possible to ensure more stable output control when the core output has increased. Moreover, the pressure of the discharge water from the separator/injector 1 can also be increased, so that the same output as that of a prior-art ABWR can be achieved by a nuclear power generation plant that has only half the number of internal pumps and is thus more economical.

Figure 24:
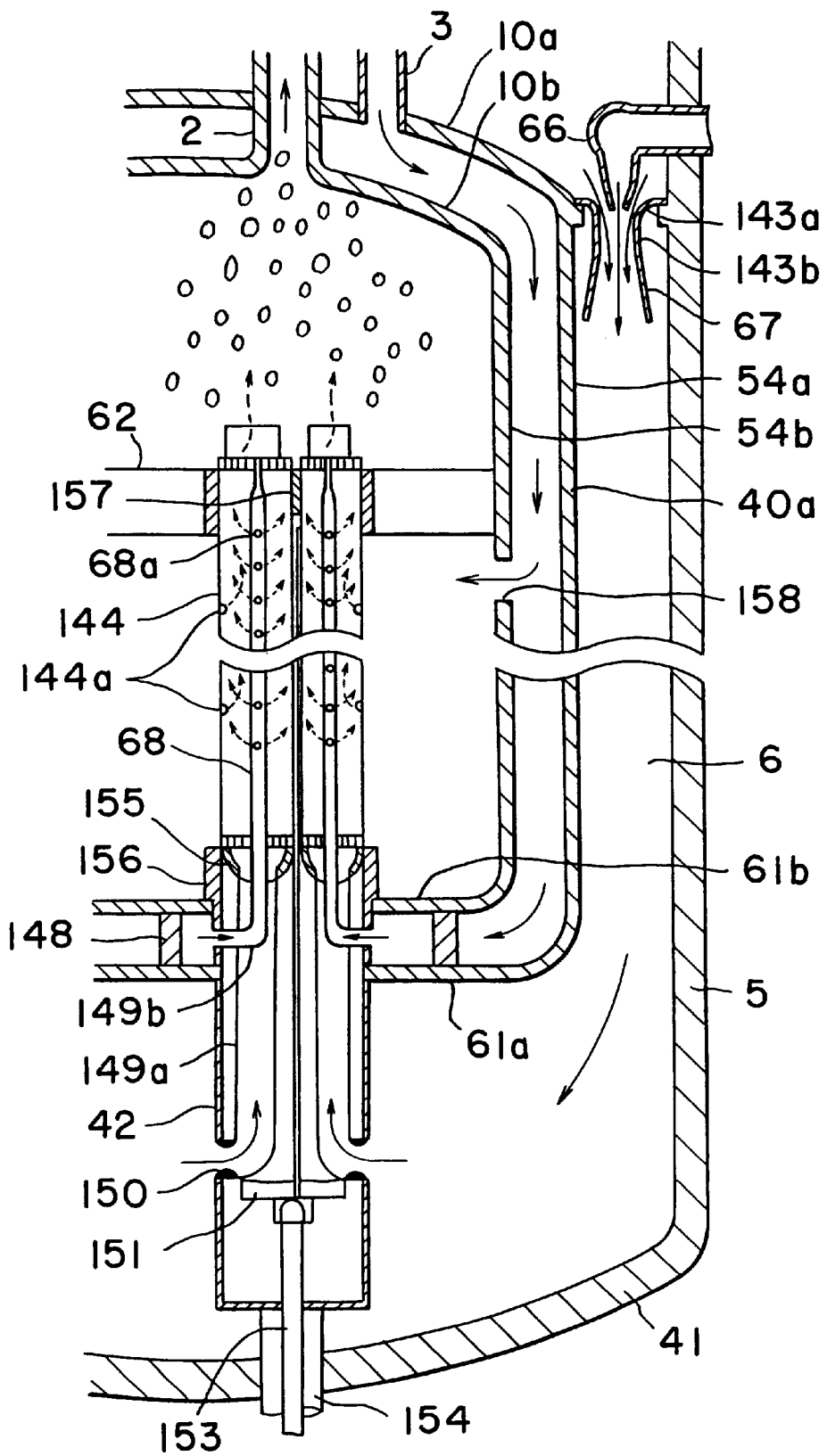
FIG. 24 is a cross-sectional view through essential components of the nuclear power generation plant of this eighth embodiment, in which holes are provided in a fuel rod assembly channel box.

The description now turns to a configuration in which channel box holes are provided for the fuel rod assembly 144 of this embodiment, to configure coolant flowpaths. A cross-sectional view through essential components of the nuclear power generation plant in such a case is shown in FIG. 24. A hole 158 is provided in the inner shroud casing 54b to introduce part of the high-pressure discharge water from the separator/injector 1 from the inner shroud casing into the core 52. Holes 144a are provided in a fuel rod assembly channel box 144 through which part of the coolant that has been introduced into the core 52 is introduced into the channel box 144. An upper lid 157 is disposed in a portion close to the upper template in part of the region in close proximity to the fuel rod assembly 144 (for example, above the control rod insertion position), to prevent the coolant introduced into the channel box 144 from being released into this region close to the fuel rod assembly.

This configuration makes it possible for part of the discharge water from the separator/injector 1 to be introduced from the outer periphery of the channel box 144 into the interior through the coolant introduction holes 158 and 144a. This enables coolant to be introduced from the outside even to fuel rods at positions far from the water rod 68, so that the coolant density in the radial direction within the fuel rod assembly 144 can be made more even, which in turn makes the output distribution more even.

Ninth Embodiment

Figure 25:
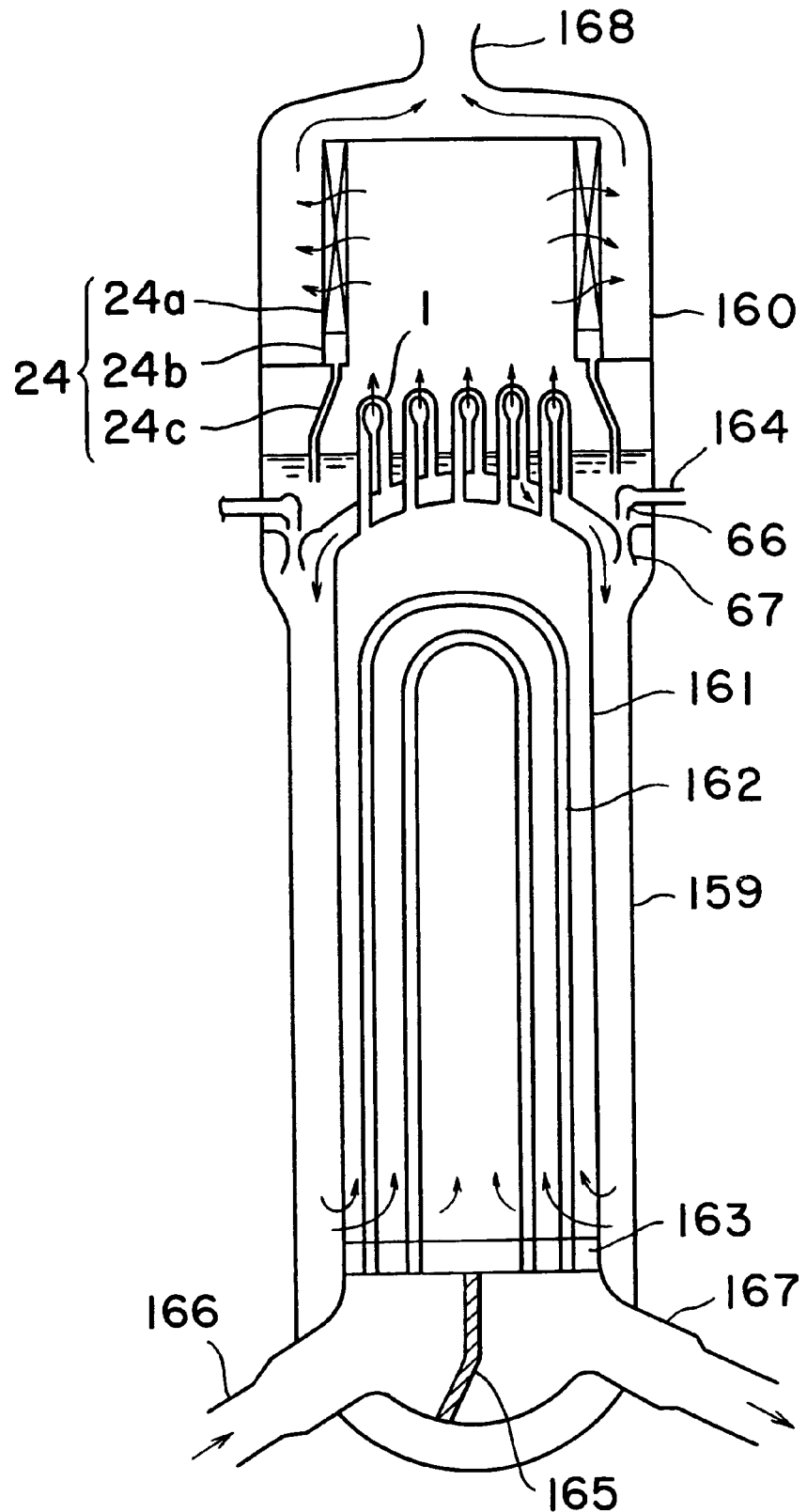
FIG. 25 is a schematic cross-sectional view of essential components of a nuclear power generation plant in accordance with a ninth embodiment of the present invention.

The description now turns to a ninth embodiment of the present invention. The above described fourth to eighth embodiments concerned the use of separator/injectors in boiling water reactors, but the separator/injector of this embodiment can also be applied to a pressurized water reactor (PWR) or a fast breeder reactor. This embodiment concerns a separator/injector in a PWR. The essential components of the nuclear power generation plant of this embodiment are shown schematically in FIG. 25.

This embodiment is characterized in that it strengthens the natural recirculation forces within a steam generator of a pressurized water reactor that uses the separator/injector 1. The structure of the separator/injector itself is substantially the same as that described above in the nuclear power generation plants of the fourth to eighth embodiments, so further description thereof is omitted.

Reference numbers 159, 160, and 161 in the FIG. denote a lower casing, upper casing, and inner casing of the steam generator, respectively, reference number 163 denotes a pipe plate 163, and reference number 165 denotes a separator plate. A heat exchanger that uses U-shaped pipes 162 of Inconel as heat-transfer pipes is disposed within the inner casing 161 of the steam generator. Primary coolant flows into the steam generator from an inlet nozzle 166 provided in the lower casing 159, the vapor and liquid thereof are separated, and the liquid phase of the coolant is then discharged from a primary coolant outlet nozzle 167 provided in the lower casing 159. During this time, steam that has had the moisture removed therefrom by the separator/injector 1 and the annular dryer 24 is released from a steam outlet nozzle 168 provided in the upper casing 160. The feed water nozzle 166 and outlet nozzle 167 are connected to a reactor vessel (not shown in the figure) surrounding the core.

This embodiment is characterized in that both the discharge water from the separator/injector 1 and the discharge water from the feedwater drive jet pump 67, supplied through a feedwater nozzle 164, are supplied by using the space formed between the inner casing 161 and lower casing 159 of the steam generator as a flowpath for the downward flow.

Since this configuration uses the secondary flow within the steam generator as a forced circulatory system instead of the prior-art natural circulatory system, the heat-transfer characteristics can be improved and thus the steam generator can be made smaller than in the prior art.

This reduction in size leads to a shortening of the heat-transfer pipes, which makes it possible to simplify the support configuration of the heat-transfer pipes, even when the heat-transfer pipes are likely to be subjected to vibration due to air bubbles in the two-phase flow, and thus further improve the soundness of the installation.

Tenth Embodiment

The description now turns to a tenth embodiment of the present invention. As described above, the use of separator/injectors in a nuclear power generation plant makes it possible to convert a neat exchanger having a boiling range from a natural circulatory system to a forced circulatory system. The range of application of this technique is extremely wide and is not limited to nuclear power generation plants; it can also be applied other systems such as small general-purpose boilers. An example of the application of the present invention to a boiler is described below. A boiler in which this embodiment is used is shown schematically in FIG. 26.

This boiler is provided with a pressure vessel 200 having an inner casing 206 surrounding a heat exchanger and a combustion chamber 207 that heats heat-transfer pipes 201 that configure the heat exchanger; a feedwater pump 203 that supplies water through a feedwater nozzle 202 provided in a space between the pressure vessel 200 and the inner casing 206; a recirculation pump 205 that recirculates the fluid that flows through the pressure vessel 200; and a fan 208 and an exhaust pipe 209 provided connected to the pressure vessel 200.

The separator/injector 1 of the first embodiment is erected above the heat-transfer pipes 201 and an annular dryer 24 is installed thereabove. A steam outlet nozzle 210 for removing steam that has had the moisture separated therefrom is provided above the annular dryer 24. The outlet of the diffuser 3 of each separator/injector 1 is connected to a space formed between the upper part of the inner casing 206 and a feedwater header 204 provided above the inner casing 206.

With this configuration, liquid and vapor are separated by the separator/injector 1 from a two-phase flow comprising steam bubbles generated during the heating of the heat-transfer pipes 201 by the combustion chamber 207, which burns a fuel such as kerosene or liquid natural gas. The discharge water from the separator/injector 1 is at a high pressure and this can be used to provided forced circulation within the pressure vessel 200.

In addition, the tiny amount of water that was not recovered by the separator/injector 1 and the moisture from the dryer 24 are recovered by the small recirculation pump 205 provided outside the pressure vessel 200 and are sent back into the heat-transfer pipes 201. The flow-rate in this case is no more than that of the water that was not recovered by the separator/injector 1, so that the flow-rate of the recirculation pump 205 can be reduced to less than 40% of that of the prior art.

Figure 26:
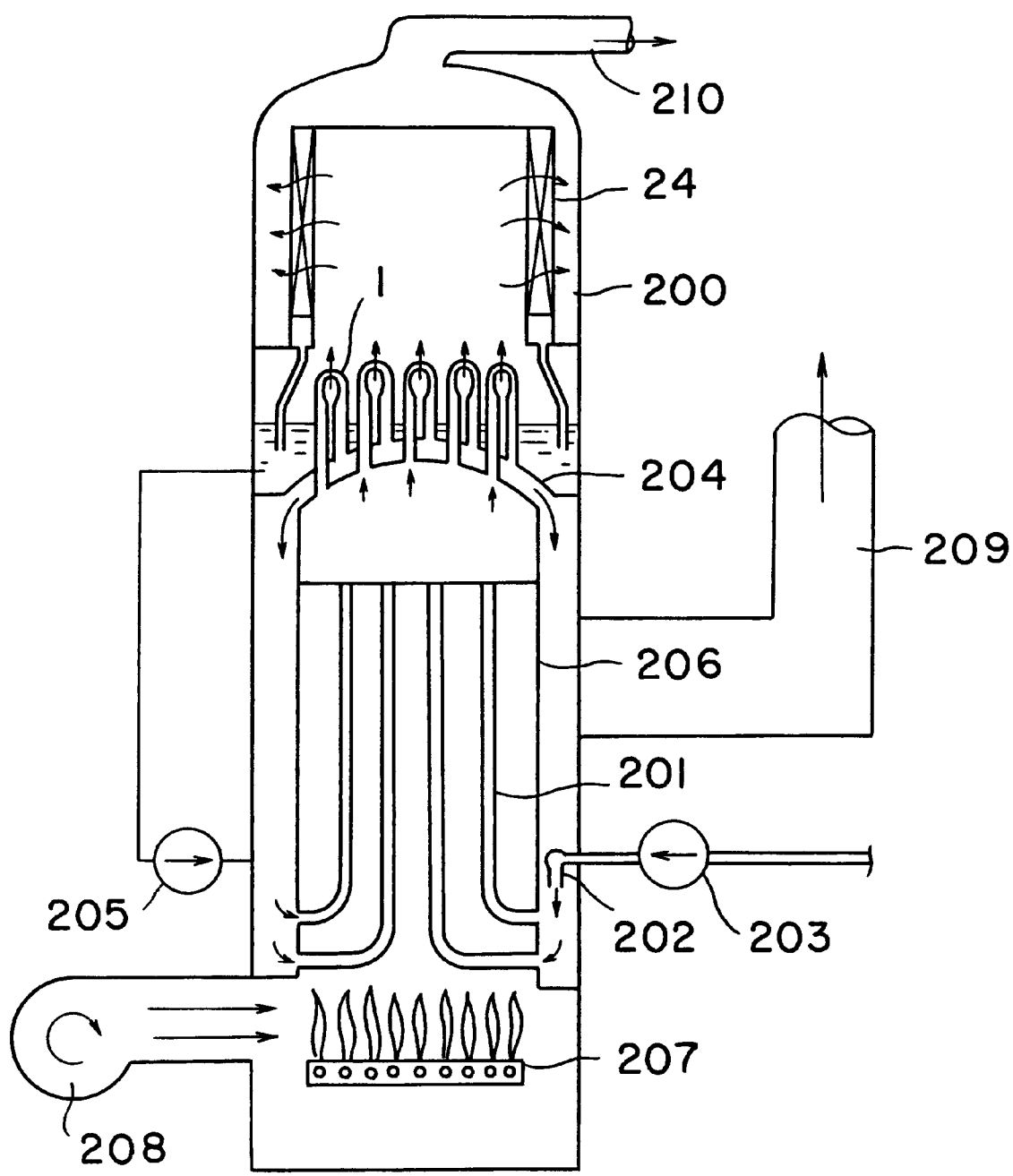
FIG. 26 is a schematic cross-sectional view of essential components of a nuclear power generation plant in accordance with a tenth embodiment of the present invention.
Figure 27:
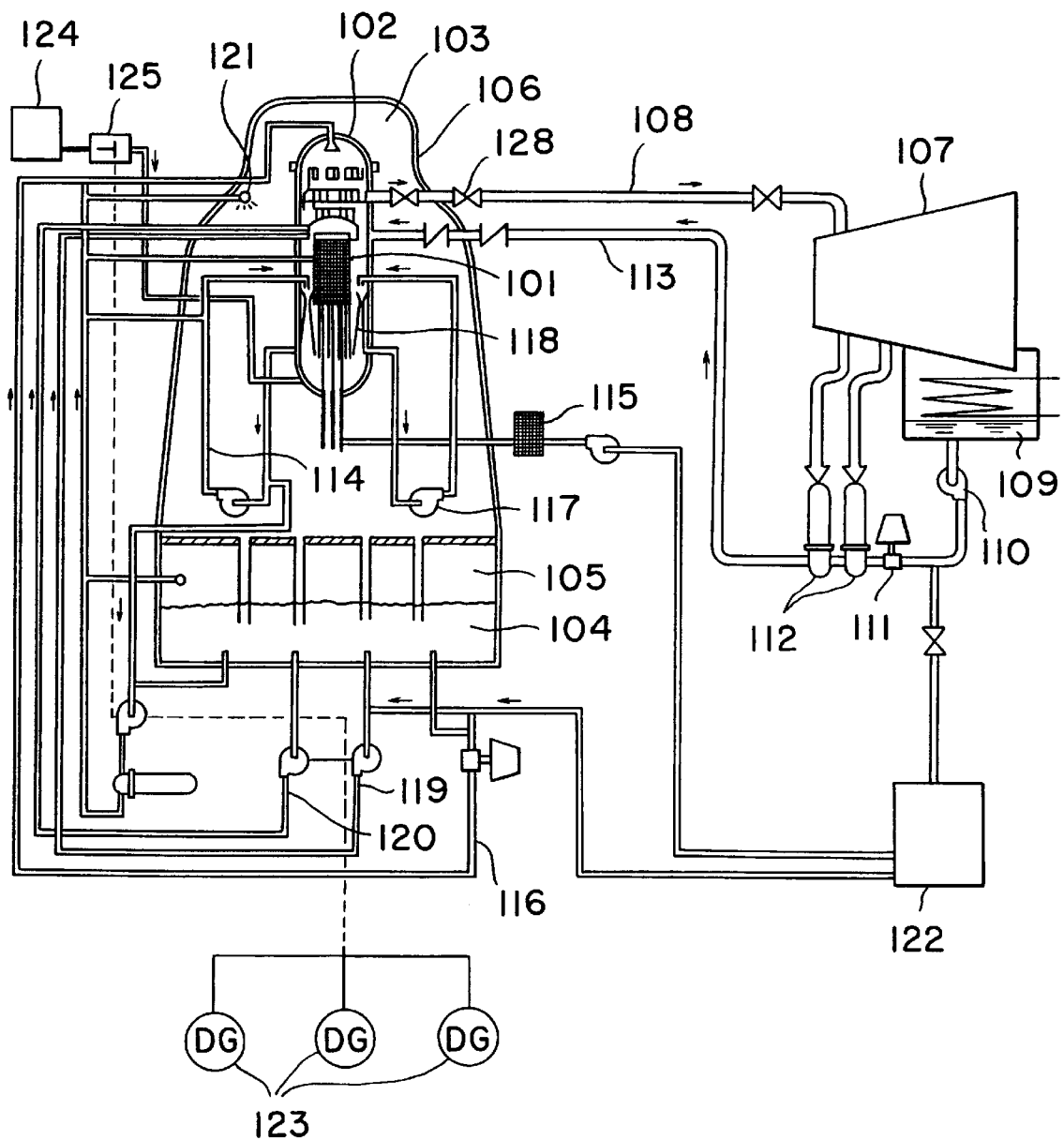
FIG. 27 is a cross-sectional view through the piping of a conventional BWR nuclear power generation plant, with some portions shown as blocks.

Other types of through-boiler could be considered as the above general-purpose boiler, in which case a configuration similar to that of FIG. 26 would make it possible to separate the liquid and vapor from a two-phase flow, increase the pressures thereof, and obtain a driving force therefrom.

What is claimed is:

1. A steam separator comprising:
   a separator/injector comprising:
      a two-phase flow accelerator nozzle having an inlet portion opening toward a source of a two-phase liquid-vapor flow, which comprises a liquid-phase component and a vapor-phase component, and an outlet portion positioned higher than said inlet portion, said accelerator nozzle accelerating said two-phase liquid-vapor flow flowing into said inlet portion and discharging the same from said outlet portion;

a liquid-phase capture means connected to said outlet portion of said two-phase flow accelerator nozzle and having a guide wall formed as an inverted U-shape curve, so that said two-phase flow, which is discharged from said outlet portion of said two-phase flow accelerator nozzle, is guided along a wall surface of said guide wall, said liquid-phase capture means imparting centrifugal forces to said vapor-phase component and said liquid-phase component to separate said liquid-phase component from said vapor-phase component, wherein a difference in centrifugal forces imparted to said vapor-phase component and said liquid-phase component of said two-phase flow while said two-phase flow is guided along said guide wall causes said liquid-phase component to be guided along the wall surface of said guide wall and be captured, whereas said vapor-phase component is separated from said guide wall; and a diffuser into which said liquid-phase component captured by said liquid-phase capture means is allowed to flow, said diffuser increasing the pressure of said liquid-phase component as said liquid-phase component flows therethrough, and discharging said liquid-phase component from an outlet side thereof.

2. The steam separator as defined in claim 1, further comprising a foundation portion on which said separator/injector is erected upon, said foundation portion comprising:

an upper plate; and a lower plate positioned below said upper plate to form a space therebetween, wherein said inlet portion of said two-phase flow accelerator nozzle communicates with a space positioned below said lower plate, and said outlet side of said diffuser communicates with said space formed between said upper and lower plates.

3. The steam separator as defined in claim 1, wherein said wall surface of said guide wall of said liquid-phase capture means is formed in an arch-shaped curve oriented upwardly, and at least one portion thereof is in the shape of a circular or elliptical arc.

4. The steam separator as defined in claim 1, wherein a side edge portion of said guide wall of said liquid-phase capture means is bent in a direction to enclose said two-phase flow within a cross-sectional surface that defines a flowpath for said two-phase flow.

5. The steam separator as defined in claim 1, wherein at least one portion of an inner wall surface of said two-phase flow accelerator nozzle said wall surface of said guide wall of said liquid-phase capture means, and an inner wall surface of said diffuser includes riblet grooves formed in the direction of flow of said liquid-phase flow.

6. The steam separator as defined in claim 1, further comprising an outer tube having an axis extending vertically and an inner tube having an axis extending vertically and disposed within said outer tube, wherein said wall surface of said guide wall of said liquid-phase capture means is formed by part of an inner wall surface of said inner tube, wherein said diffuser contacts an inner wall of said inner tube, and wherein a space is formed between an inner wall surface of said outer tube and an outer wall surface of said inner tube so that said liquid-phase component discharged from said outlet side of said diffuser flows therethrough.

7. The steam separator as defined in claim 6, wherein said a lower portion of said two-phase flow accelerator nozzle is formed along said axis of said inner tube, said outlet portion of said two-phase flow accelerator nozzle is formed in proximity to said inner wall of said inner tube, and said diffuser is formed in a helical shape with respect to said axis of said inner tube.

8. A nuclear power generation plant using a boiling-water reactor, said nuclear power generation plant comprising:

a reactor pressure vessel;

a plurality of fuel rod assemblies, disposed within said reactor pressure vessel, through which a coolant flows;

a shroud surrounding said plurality of fuel rod assemblies, wherein a two-phase liquid-vapor flow comprising a liquid-phase component and a vapor-phase component is created as said coolant flows within said plurality of fuel rod assemblies, said shroud including a shroud head at an upper end thereof; and a separator/injector erected above said shroud head said separator/injector comprising:

a two-phase flow accelerator nozzle having an inlet portion opening toward the interior of said shroud and an outlet portion positioned higher than said inlet portion, said accelerator nozzle accelerating said two-phase liquid-vapor flow, which is generated in said shroud and flows into said inlet portion, and discharging the same from said outlet portion;

a liquid-phase capture means connected to said outlet portion of said two-phase flow accelerator nozzle and having a guide wall formed as an inverted U-shape curve, so that said two-phase flow, which is discharged from said outlet portion of said two-phase flow accelerator nozzle, is guided along a wall surface of said guide wall, said liquid-phase capture means imparting centrifugal forces to said vapor-phase component and said liquid-phase component to separate said liquid-phase component from said vapor-phase component, wherein a difference in centrifugal forces imparted to said vapor-phase component and said liquid-phase component of said two-phase flow while said two-phase flow is guided along said guide wall causes said liquid-phase component to be guided along the wall surface of said guide wall and be captured, whereas said vapor-phase component is separated from said guide wall; and a diffuser into which said liquid-phase component captured by said liquid-phase capture means is allowed to flow, said diffuser increasing the pressure of said liquid-phase component as said liquid-phase component flows therethrough, and discharging said liquid-phase component from an outlet side thereof.

9. The nuclear power generation plant as defined in claim 8, further including a recirculation flowpath for returning to the interior of said shroud said increased-pressure coolant that flows out of said outlet side of said diffuser.

10. The nuclear power generation plant as defined in claim 8, wherein the wall surface of said guide wall of said liquid-phase capture means is a smooth curve.

11. The nuclear power generation plant as defined in claim 8, wherein said shroud head is formed as a double wall structure having an upper shroud head and a lower shroud head, which is positioned below said upper shroud head and forming a space between said upper and lower shroud heads, wherein said inlet portion of said two-phase flow accelerator nozzle communicates with a space within said shroud that is positioned below said lower shroud head, and wherein said outlet portion of said diffuser communicates with said space formed between said upper and lower shroud heads.

12. The nuclear power generation plant as defined in claim 11, further comprising:

a downcomer portion surrounding said shroud;

a jet pump drive nozzle disposed in an upper portion of said downcomer portion surrounding said shroud; and a jet pump provided below said jet pump drive nozzle;

wherein after said coolant discharged from said diffuser passes through said space formed between said upper and lower shroud heads, said coolant is guided into said jet pump through said jet pump drive nozzle.

13. The nuclear power generation plant as defined in claim 12, further comprising:

a feedwater pump that supplies water to said reactor pressure vessel;

a feedwater pipeline linking said reactor pressure vessel to said feedwater pump; and a branch pipeline branching off from said feedwater pipeline and communicating with said jet pump drive nozzle, wherein said feedwater pump supplies water to said jet pump through said branch pipeline and said jet pump drive nozzle.

14. The nuclear power generation plant as defined in claim 13, wherein pressure is increased to control the circulation flow-rate in sequence from the interior of said downcomer portion, the interior of said shroud, said inlet portion of said separator/injector, to said outlet portion of said separator/injector by controlling the flow-rate and discharge pressure of water supplied from said feedwater pump to said jet pump, thereby controlling the thermal output generated within said reactor pressure vessel.

15. The nuclear power generation plant as defined in claim 13, wherein said jet pump is driven at the start-up of said plant by mixing a flow of feedwater supplied from at least one of a pump in a residual heat removal system and a pump in a reactor water clean-up system with a flow of feedwater supplied from said feedwater pump to said jet pump.

16. The nuclear power generation plant as defined in claim 12, further comprising:

a recirculation flow-rate control valve disposed in said outlet portion or said inlet portion of said jet pump; and a flow-rate control means, which uses at least one of an electrical generator output signal, a main steam flow-rate signal, a neutron flux output signal, and a jet pump pressure difference signal as an input signal, for calculating a suitable recirculation flow-rate and corresponding degree of opening of said recirculation flow-rate control valve therefrom, and outputting a valve-opening signal.

17. The nuclear power generation plant as defined in claim 16, further comprising:

a feedwater pump that supplies water to said reactor pressure vessel;

a feedwater pipeline linking said reactor pressure vessel to said feedwater pump;

a flow-rate adjustment valve provided in said feedwater pipeline; and a branch pipeline branching off from said feedwater pipeline and communicating with said jet pump drive nozzle, wherein said flow-rate control means controls a water level of said reactor by calculating a suitable degree of opening of said flow-rate adjustment valve and outputting a valve-opening signal to said flow-rate adjustment valve.

18. The nuclear power generation plant as defined in claim 16, further comprising:

a feedwater pump that supplies water to said reactor pressure vessel;

a feedwater pipeline linking said reactor pressure vessel to said feedwater pump;

flow-rate adjustment valve provided in said feedwater pipeline; and a branch pipeline branching off from said feedwater pipeline and communicating with said jet pump drive nozzle, wherein said flow-rate control means controls the flow-rate of feedwater of said reactor by calculating a suitable feedwater flow-rate and outputting a rotational frequency signal to said feedwater pump.

19. The nuclear power generation plant as defined in claim 11, further comprising:

a downcomer portion surrounding said shroud;

a jet pump drive nozzle disposed in an upper portion of said downcomer portion surrounding said shroud;

a bell mouth opening towards said downcomer portion in close proximity to said jet pump drive nozzle;

a straight pipe having one end connected to a leading edge of said bell mouth and another end connected to an inlet side of said jet pump; and a jet pump provided below said jet pump drive nozzle, wherein after said coolant, which has accumulated in said upper shroud head without passing through said diffuser, passes through said bell mouth and said straight pipe via said jet pump drive nozzle, said coolant is guided into said jet pump.

20. The nuclear power generation plant as defined in claim 8, wherein said shroud head is formed as a double-wall structure having an upper shroud head and a lower shroud head, which is positioned below said upper shroud head, and form a space between said upper and lower shroud heads, said plant further including:

a downcomer pipe having an upper end portion opening upwardly in an upper surface of said upper shroud head, for guiding downwardly the liquid-phase component accumulated on said upper surface of said upper shroud head, which liquid phase component not captured by said liquid-phase capture means;

an impeller provided in a lower portion of said downcomer pipe for directing the liquid-phase component of the coolant flowing downwardly within said downcomer pipe and discharging toward a lower portion of said shroud; and an internal pump for driving said impeller, wherein said outlet side of said diffuser communicates with a space formed between said upper and lower shroud heads, and coolant, which is discharged from said outlet side of said diffuser flows down through said space formed between said upper and lower shroud heads and into a downcomer portion on an outer side of said downcomer pipe, is discharged to a lower portion of said shroud.

21. The nuclear power generation plant as defined in claim 20, further comprising a recirculation flow-rate control means, which uses at least one of an electrical generator output signal, a main steam flow-rate signal, a neutron flux output signal, and a core support plate pressure difference signal as an input signal, for calculating a suitable recirculation flow-rate and a suitable rotational frequency of said impeller therefrom, and outputting a suitable rotational-frequency signal with respect to said internal pump.

22. The nuclear power generation plant as defined in claim 21, wherein said recirculation flow-rate control means calculates the rotational frequency of said internal pump by performing calculations in accordance with overall proportional integral differential (PIE) control relating to a difference from a predetermined water level based on an input reactor core water-level signal.

23. The nuclear power generation plant as defined in claim 11, further including a shroud casing forming a side portion of said shroud and a core support plate forming a lower portion of said shroud, wherein each of said shroud casing and said core support plate is formed as a double-wall structure, and said plant further comprising:
   a first coolant circulation pathway mutually communicating with said space between said shroud heads, a space formed between said double-wall shroud structure, and a space formed between said double-wall core support plates, through which flows coolant discharged from said outlet portion of said diffuser;
   a water rod provided in the interior of said fuel rod assemblies, within which coolant flows;
   a first coolant guide pipe communicating with said first coolant circulation pathway with an outlet portion at a lower end of said water rod, for guiding increased-pressure coolant, which has been discharged from said outlet side of said diffuser and which is flowing through said first coolant circulation pathway, to said outlet portion at the lower end of said water rod; and
   a hole formed in a side surface of said water rod, for ejecting coolant flowing within said water rod to the exterior of said water rod.

24. The nuclear power generation plant as defined in claim 23, wherein the coefficient of thermal expansion of a material configuring said first coolant guide pipe and the coefficient of thermal expansion of a material configuring said water rod are set to be different in the vicinity of a connective portion between said first coolant guide pipe and said water rod.

25. The nuclear power generation plant as defined in claim 23, wherein labyrinth grooves are provided in said first coolant guide pipe and said water rod in the vicinity of a connective portion between said first coolant guide pipe and said water rod.

26. The nuclear power generation plant as defined in claim 23, further comprising:
   a control rod tube positioned below said fuel rod assemblies;
   a lower tie plate associated with said fuel rod assemblies;
   a second coolant guide pipe provided within said control rod tube positioned below said fuel rod assemblies, for guiding coolant that is outside said shroud into said lower tie plate of said fuel rod assemblies; and
   an orifice provided in a second coolant circulation path formed by said second coolant guide pipe, for locally constricting the flowpath thereof.

27. The nuclear power generation plant as defined in claim 23, further including a channel box associated with said fuel rod assemblies, wherein holes are formed in a side surface of an inner shroud casing of said double-wall shroud structure, and a side surface of said channel box of said fuel rod assemblies.

28. A nuclear power generation plant using a pressurized-water reactor, wherein said nuclear power generation plant comprises:
   a steam generator comprising a heat exchanger formed of heat-exchange pipes having inlets and outlets for a primary coolant, a lower casing surrounding said heat exchanger, and an upper casing connected to said lower casing and having a steam outlet for supplying steam to a turbine;
   a fuel rod assembly;
   a reactor container communicating with said steam generator and surrounding said primary coolant and said fuel rod assembly; and
   a separator/injector provided above said lower casing, wherein said separator/injector comprises:
      a two-phase flow accelerator nozzle having an inlet portion opening toward the interior of said lower casing and an outlet portion positioned higher than said inlet portion, said accelerator nozzle accelerating a two-phase flow of said primary coolant that flows into an interior portion thereof from said inlet portion and discharging the same from said outlet portion, said two-phase flow comprising a vapor-phase component and a liquid-phase component;
      a liquid-phase capture means connected to said outlet portion of said two-phase flow accelerator nozzle and having a guide wall formed as an inverted U-shape curve, so that said two-phase flow, which is discharged from said outlet portion of said two-phase flow accelerator nozzle, is guided along a wall surface of said guide wall, said liquid-phase capture means imparting centrifugal forces to said vapor-phase component and said liquid-phase component to separate said liquid-phase component from said vapor-phase component, wherein a difference in centrifugal forces imparted to said vapor-phase component and said liquid-phase component of said two-phase flow while said two-phase flow is guided along said guide wall causes said liquid-phase component to be guided along the wall surface of said guide wall and be captured, whereas said vapor-phase component is separated from said guide wall; and
      a diffuser into which said liquid-phase component captured by said liquid-phase capture means is allowed to flow, said diffuser increasing the pressure of said liquid-phase component as said liquid-phase component flows therethrough, and discharging said liquid-phase component from an outlet side thereof.

29. The nuclear power generation plant as defined in claim 28, further comprising an inner casing surrounding said heat exchanger within said lower casing, wherein discharge water exhausted from said diffuser is guided into said heat exchanger through a space formed between said lower casing and said inner casing.

30. A boiler apparatus comprising:
   a heat exchanger comprising heat-transfer tubes;
   a combustor that heats said heat-transfer tubes;
   a pressure vessel surrounding said heat-transfer tubes and said combustor;
   a recirculation pump that recirculates a fluid flowing through said pressure vessel; and
   a separator/injector provided above said heat-transfer tubes said separator/injector comprising:
   a two-phase flow accelerator nozzle having an inlet portion opening toward the interior of said pressure vessel and an outlet portion positioned higher than said inlet portion, said accelerator nozzle accelerating a two-phase liquid-vapor flow flowing into said inlet portion thereof from said heat exchanger, and discharging the same from said outlet portion, said two-phase flow comprising a vapor-phase component and a liquid-phase component;

a liquid-phase capture means connected to said outlet portion of said two-phase flow accelerator nozzle and having a guide wall formed as an inverted U-shape curve, so that said two-phase flow, which is discharged from said outlet portion of said two-phase flow accelerator nozzle, is guided along a wall surface of said guide wall, said liquid-phase capture means imparting centrifugal forces to said vapor-phase component and said liquid-phase component to separate said liquid-phase component from said vapor-phase component, wherein a difference in centrifugal forces imparted to said vapor-phase component and said liquid-phase component of said two-phase flow while said two-phase flow is guided along said guide wall causes said liquid-phase component to be guided along the wall surface of said guide wall and be captured, whereas said vapor-phase component is separated from said guide wall; and a diffuser into which said liquid-phase component captured by said liquid-phase capture means is allowed to flow, said diffuser increasing the pressure of said liquid-phase component as said liquid-phase component flows therethrough, and discharging said liquid-phase component from an outlet side thereof.

31. The boiler apparatus as defined in claim 30, further comprising an inner casing surrounding said heat exchanger within said lower casing, wherein discharge water exhausted from said diffuser is guided into said heat exchanger through a space formed between said lower casing and said inner casing.

* * * * *